United States Patent
Eisenhour

(10) Patent No.: US 9,802,617 B1
(45) Date of Patent: Oct. 31, 2017

(54) VEHICLE ACCESSORY POWER MANAGEMENT ASSEMBLY

(71) Applicant: Nissan North America, Inc., Franklin, TN (US)

(72) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 50 days.

(21) Appl. No.: 15/153,428

(22) Filed: May 12, 2016

(51) Int. Cl.
| | |
|---|---|
| *G06F 7/00* | (2006.01) |
| *B60W 30/188* | (2012.01) |
| *B60H 1/00* | (2006.01) |
| *B60H 1/32* | (2006.01) |
| *B60R 16/03* | (2006.01) |
| *B60K 25/00* | (2006.01) |

(52) U.S. Cl.
CPC ..... *B60W 30/1886* (2013.01); *B60H 1/00764* (2013.01); *B60H 1/00878* (2013.01); *B60H 1/3202* (2013.01); *B60H 1/3208* (2013.01); *B60K 25/00* (2013.01); *B60R 16/03* (2013.01); *B60W 2520/105* (2013.01); *B60W 2710/305* (2013.01)

(58) Field of Classification Search
CPC ........... B60W 30/1886; B60H 1/00764; B60H 1/00878; B61H 1/3202; B60K 25/00; B60R 16/03
See application file for complete search history.

(56) References Cited

U.S. PATENT DOCUMENTS

| | | | | |
|---|---|---|---|---|
| 5,653,143 | A | * | 8/1997 | Langevin ................ F16H 3/363 74/333 |
| 6,477,116 | B1 | * | 11/2002 | Shinkawa .............. G04C 10/00 368/157 |
| 7,972,118 | B2 | | 7/2011 | Hirabayashi et al. |
| 9,080,797 | B2 | | 7/2015 | Sishtla |
| 2011/0010269 | A1 | * | 1/2011 | Ballard .................. B60Q 5/008 705/26.41 |
| 2011/0038739 | A1 | | 2/2011 | Sabha et al. |
| 2013/0226418 | A1 | * | 8/2013 | Yang ...................... B60K 17/02 701/59 |
| 2013/0231832 | A1 | * | 9/2013 | Yang ...................... B60K 17/02 701/59 |

(Continued)

*Primary Examiner* — Ian Jen
(74) *Attorney, Agent, or Firm* — Global IP Counselors, LLP

(57) ABSTRACT

A vehicle accessory power management assembly includes a vehicle speed sensor, an accelerator sensor, an accessory device, a power transmitting device and a controller. The power transmitting device receives rotational power from a power device and transmits it to the accessory device. The power transmitting device is switchable between a first operating state and a second operating state. In the first operating state the accessory device is operated at a first power consumption level and in the second operating state the accessory device is operated at a second power consumption level lower than the first power consumption level. The controller is configured to switch the switching part from the first operating state to the second operating state in response to determining that a current level of acceleration requested of the power device is of greater importance than operating the accessory device at the first operating state.

17 Claims, 13 Drawing Sheets

(56) References Cited

U.S. PATENT DOCUMENTS

| | | | |
|---|---|---|---|
| 2013/0275014 A1* | 10/2013 | Yang | B60K 17/08 |
| | | | 701/52 |
| 2013/0341934 A1* | 12/2013 | Kawanishi | B60L 8/00 |
| | | | 290/1 A |
| 2014/0018988 A1* | 1/2014 | Kitano | B60L 15/025 |
| | | | 701/22 |
| 2014/0018989 A1* | 1/2014 | Kitano | H02P 5/74 |
| | | | 701/22 |
| 2014/0195090 A1* | 7/2014 | Takeuchi | F02D 11/105 |
| | | | 701/22 |
| 2016/0061293 A1* | 3/2016 | Hwang | F03D 15/10 |
| | | | 477/36 |

* cited by examiner

VEHICLE ACCESSORY POWER MANAGEMENT ASSEMBLY

BACKGROUND

Field of the Invention

The present invention generally relates to a vehicle accessory power management assembly. More specifically, the present invention relates to a power transmitting device that reduces the power consumption level of a vehicle accessory supplied with power from a power device in response to a determination that current acceleration of the power device is of greater importance than operation of the vehicle accessory at a higher power consumption level.

Background Information

Vehicles with accessories, such as, for example, an air conditioning system and an alternator, experience power draws on the power device (engine) under heavy acceleration when the accessories are operating. In particular, vehicles with small engines exhibit more rapid acceleration when the air conditioning system is shut off.

SUMMARY

One object of the present disclosure is to a vehicle with an accessory power management assembly that reduces the consumption of power used by accessories when it is determined that acceleration is of greater importance than operation of the accessories.

In view of the state of the known technology, one aspect of the present disclosure is to provide a vehicle with an accessory power management assembly that includes a vehicle speed sensor, a power device, an accelerator sensor, an accessory device, a power transmitting device and a controller. The vehicle speed sensor is configured to detect a current speed of a vehicle. The power device is configured to produce rotary power that powers the vehicle. The accelerator sensor is configured to detect a current of level of acceleration requested of the power device. The accessory device is supported to the power device. The power transmitting device is coupled to the power device receiving rotational power therefrom. The power transmitting device is also coupled to the accessory device. The power transmitting device is switchable between a first operating state and a second operating state. In the first operating state the accessory device is provided with rotary power from the power device via the power transmitting device at a first power consumption level. In the second operating state the accessory device is provided with rotary power from the power device via the power transmitting device at a second power consumption level that is lower than the first power consumption level. The controller is connected to the vehicle speed sensor, the accelerator sensor and the power transmitting device. The controller is configured to switch the switching part from the first operating state to the second operating state in response to the controller determining that at the current speed of the vehicle the current level of acceleration requested of the power device is of greater importance than operating the accessory device at the first operating state.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
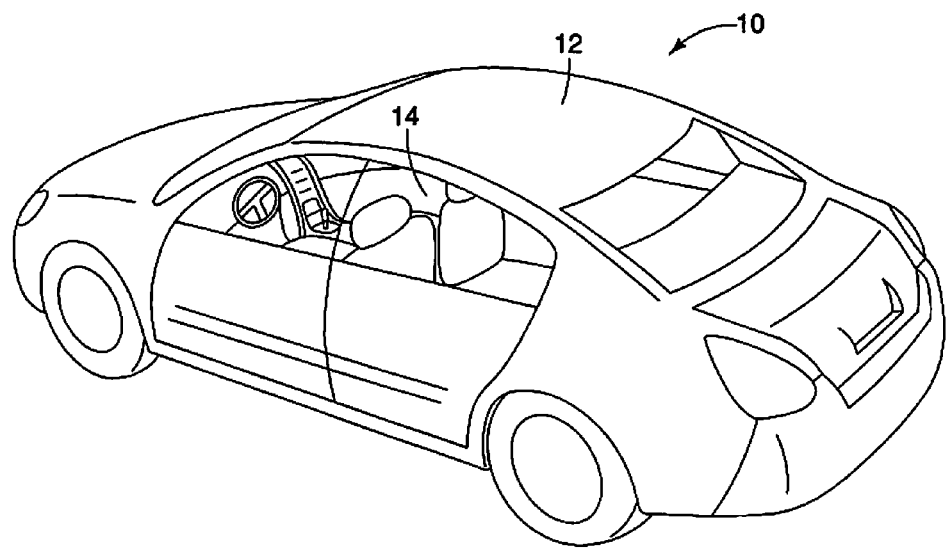
FIG. 1 is a perspective view of a vehicle that includes an accessory power management assembly in accordance with a first embodiment.
Figure 2:
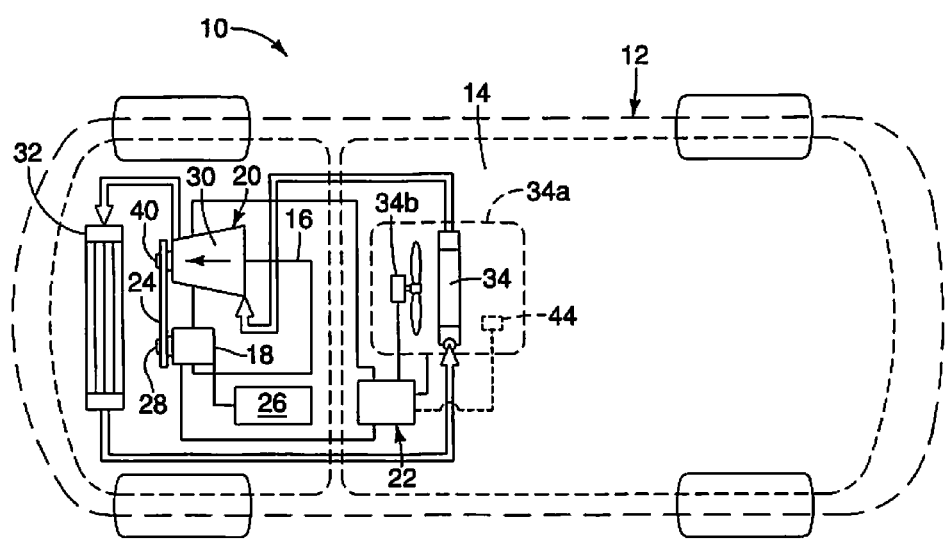
FIG. 2 is a schematic overhead view of the vehicle showing details of a power device, accessories powered by the power device and a controller of the accessory power management assembly in accordance with the first embodiment.

Referring initially to FIG. 1, a vehicle 10 having is illustrated in accordance with a first embodiment. As shown in FIG. 2, the vehicle 10 includes a vehicle body structure 12 that defines a passenger compartment 14, a power device 16, a plurality of accessories, such as an alternator 18 and an air conditioning system 20, and a vehicle accessory power management assembly 22.

The power device 16 is a primary power producing mechanism within the vehicle 10, where the power device 16 provides propulsion torque that moves the vehicle 10. For example, the power device 16 can be any of a variety of power producing mechanisms, such as a diesel fuel internal combustion engine, a gasoline fuel internal combustion engine, a hydrogen powered engine (or fuel cell), an electric motor, or hybrid power plant that includes both an electric motor and a hydrocarbon fuel powered engine. The power device 16 also includes a transmission (not shown) and drive shaft(s) (not shown) that provide rotary power to at least two of the wheels of the vehicle 10.

The power device 16 includes a belt 24 that is rotated by an output shaft (not shown) of the power device 16 in a conventional manner. The power device 16 also includes conventional features such as a starter mechanism (not shown) and an accelerator pedal (not shown) that is manipulated by a vehicle operator to control the speed of the vehicle 10 and change the level of acceleration of the power device 16. Since power devices, such as the power device 16 are conventional vehicle mechanisms, further description is omitted for the sake of brevity.

The alternator 18 is a conventional vehicle component that produces electricity for use within the vehicle 10, and in particular, is connected to a battery 26 in order to recharge the battery 26 in a conventional manner. The alternator 18 includes a first power transmitting device 28 that is switchable between a first operating state and a second operating state. In the first operating state the alternator 18 (an accessory device) is provided with rotary power from the power device 16 via the power transmitting device 28 at a first power consumption level and in the second operating state the alternator 18 is provided with rotary power from the power device 16 via the power transmitting device 28 at a second power consumption level, as described in greater detail below. The first power transmitting device 28 includes a pulley that engages the belt 24 such that the first power transmitting device 28 receives rotary power from the power device 16 via the belt 24.

The air conditioning system 20 includes a compressor 30, a condenser 32 and an evaporator 34. Since compressors, condensers and evaporators are conventional components of air conditioning systems, further description of the compressor 30, the condenser 32 and the evaporator 34 is omitted, except for those specific details and features that assist in understanding the inventions described herein.

The compressor 30 includes a second power transmitting device 40. Like the first power transmitting device 40, the second power transmitting device 40 is switchable between a first operating state and a second operating state. In the first operating state the compressor 30 is provided with rotary power from the power device 16 via the second power transmitting device 40 at a first power consumption level and in the second operating state the compressor 30 is provided with rotary power from the power device 16 via the second power transmitting device 40 at a second power consumption level, as described in greater detail below. The second power transmitting device 40 also includes a pulley that engages the belt 24 such that the second power transmitting device 40 receives rotary power from the power device 16 via the belt 24.

Figure 3:
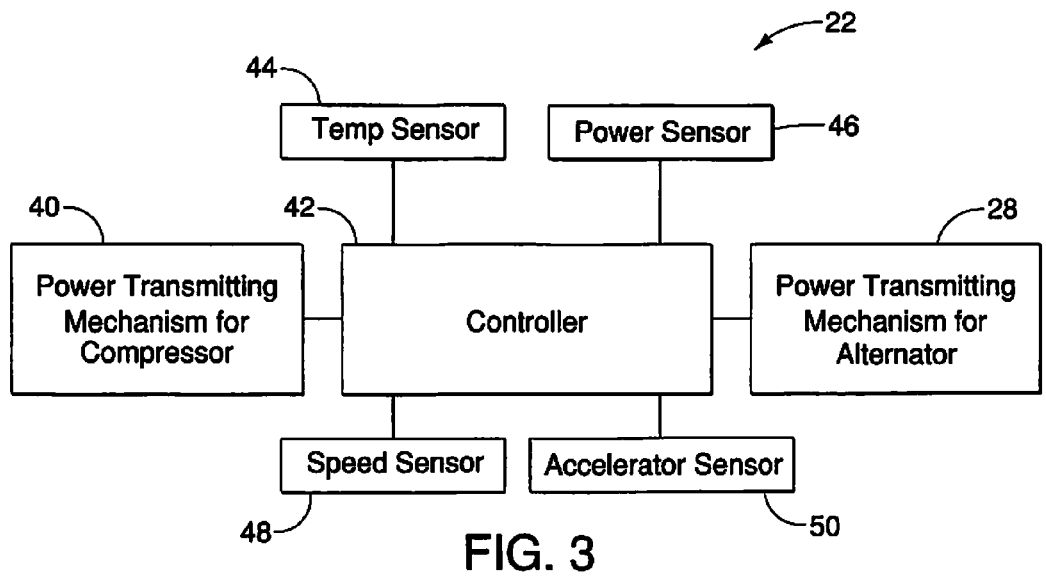
FIG. 3 is a schematic block diagram of the elements of the accessory power management assembly, including the controller in accordance with the first embodiment.

As shown schematically in FIG. 3, the vehicle accessory power management assembly 22 includes a controller 42, a temperature sensor 44, a power sensor 46, a speed sensor 48 and an accelerator sensor 50. The controller 42 is connected to each of the first power transmitting device 28, the second power transmitting device 40, the temperature sensor 44, the power sensor 46, the speed sensor 48 and the accelerator sensor 50. The controller 42 uses data received from selected ones of the temperature sensor 44, the power sensor 46, the speed sensor 48 and the accelerator sensor 50 in order to control operation of the first power transmitting device 28 and the second power transmitting device 40, as is described in greater detail below.

The temperature sensor 44 is configured to measure temperature either within the passenger compartment 14, or the temperature of air that has been cooled passing over cooling surfaces of the evaporator 34 in a conventional manner. The location of the temperature sensor 44 can vary vehicle-to-vehicle. For example, the temperature sensor 44 can be located within the passenger compartment 14, or can be located adjacent to or downstream of the evaporator 34 within an air handler 34a that houses the evaporator 34.

The power sensor 46 is connected to one or both of the battery 26 and the alternator 18 and is configured to detect one or both of the level of charge of the battery and/or the electrical demands being placed on the alternator 18 and battery 26. The electrical demands placed on the alternator 18 and battery 36 include, for example, operation of the blower motor 34b within the air handler housing 34a, operation of an audio system (not shown) within the vehicle 10, or other electrical devices (not shown). Further, the power sensor 46 can be configured to detect the health and/or status of the charge of the battery 26 by detecting voltage output level and reactions to changes in loads applied to the battery 26 and/or the alternator 18 during usage of electrical devices within the vehicle 10.

The speed sensor 48 of the vehicle accessory power management assembly 22 is configured to measure and output signals representing the current speed of the vehicle 10. The speed sensor 48 can be located on the power device 16, on a transmission (not shown) attached to the power device 16, or any other conventional location within the vehicle 10 to measure speed of the vehicle 10. The accelerator sensor 50 is configured to measure and output signals representing changes in the speed of the vehicle 10. Specifically, the accelerator sensor 50 is coupled to, for example, the accelerator pedal (not shown) of the vehicle 10, or to the throttle body (not shown) of the power device 16, to measure the level of acceleration currently being requested of the power device 16. For example, if a vehicle operator or a cruise control mechanism (not shown) is in the process of manipulating the throttle or accelerator of the power device 16, the accelerator sensor 50 measures level of acceleration and sends corresponding signals to the controller 42 so that the controller 42 can process the data corresponding to the current level of acceleration, as is described in greater detail below.

In the first embodiment, the first power transmitting device 28 is installed to the alternator 18 in a conventional manner and the second power transmitting device 40 is installed to the compressor 30 in a conventional manner. In the first embodiment, both the first power transmitting device 28 and the second power transmitting device 40 are conventional electromagnetic clutch mechanisms. However, as shown in further embodiments, the first power transmitting device 28 and the second power transmitting device 40 can be any of a variety of power transmitting mechanisms, as described below. Further, since the first power transmitting device 28 and the second power transmitting device 40 are both powered by the power device 16 via the belt 24, in an alternative embodiment it is possible to replace the first power transmitting device 28 and the second power transmitting device 40 with a single power transmitting device located at the main crankshaft of the power device 16, as described in greater detail below.

In the first embodiment, one or both of the first power transmitting device 28 and the second power transmitting device 40 are controlled by the controller 42 in order to switch the operation of the alternator 18 and the compressor 30 between a normal operating condition and a compromise operating condition in response to conditions where the power device 16 needs to provide rapid acceleration to the vehicle 10, as is described in greater detail below. In the normal operating condition, the first power transmitting device 28 and the second power transmitting device 40 are provided with power from the power device 16 at a first power consumption level where alternator 18 and the compressor 30 can use the power they need from the power device 16 without hindrance. In the compromise operating condition, the alternator 18 and the compressor 30 are operated at a second power consumption level where power consumption is reduced or eliminated (lower than the first power consumption level) thereby allowing the power device 16 to provide an unencumbered level of power for acceleration of the vehicle 10. In the first embodiment, the second power consumption level includes depriving one or both of the alternator 18 and the compressor 30 of rotary power from the power device 16 for a predetermined length of time, as is described in greater detail below. In other embodiments, the second power consumption level can be a reduction in power provided by the power device 16, not necessarily a complete lack of power.

Figure 4:
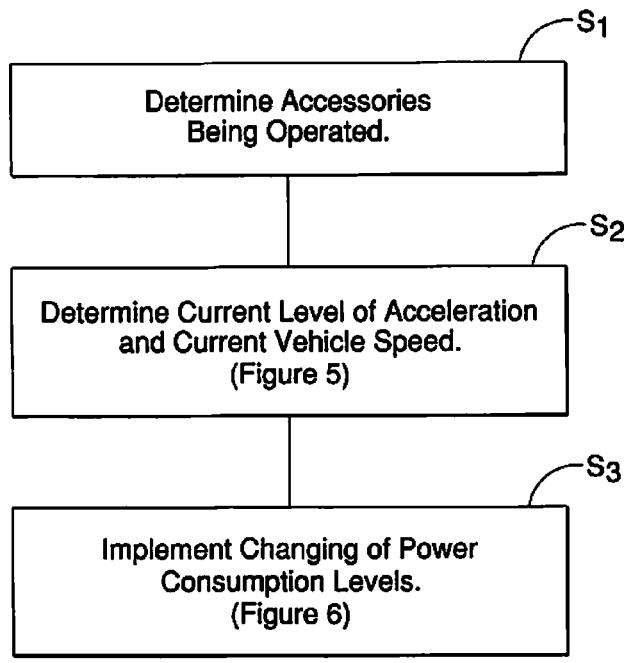
FIG. 4 is a first flowchart showing basic operational organization of the logic used by the controller of the accessory power management assembly in accordance with the first embodiment.

A description of a basic outline of the logic implemented by the controller 42 is now provided initially with reference to the steps depicted in FIG. 4. As shown schematically in FIG. 4, the controller 42 is configured at step S1 to determine which of the accessories are currently being operated. In the first embodiment, for example, the alternator 18 and the compressor 30 of the air conditioning system 20 are the only two accessories depicted. It should be understood that there can be additional accessories and that the depiction of the alternator 18 and the compressor 30 are examples used to explain the implementation of the present invention.

At step S1, the controller 42 determines whether one or both of the alternator 18 and the compressor 30 is requiring rotary power from the power device 16. The alternator 18 is typically always using at least a small level of rotary power from the power device 16 to produce electric power for devices within the vehicle 10 that require electric power. The alternator 18 also selectively provides power to the battery 26 in order to recharge the battery in a conventional manner.

The compressor 30 primarily only uses rotary power from the power device 16 when the air conditioning system 20 is in operation in order to cool or dehumidify the passenger compartment 14. For the purpose of explaining operation of the vehicle accessory power management assembly 22 and more specifically, operations of the controller 42, it is assumed in the description of the flowcharts depicted in FIGS. 5 and 6 that both the alternator 18 and the compressor 30 are using rotary power from the power device 16.

In vehicles with small motor corresponding to the power devices 16, the controller 42 can be configured to reduce or cut off power consumption of both the first power transmitting device 28 and the second power transmitting device 40 when acceleration of the vehicle 10 is determined to be more important than operation of accessories. Alternatively, in a vehicle with a more powerful motor (corresponding to the power device 16), the alternator 18 can be provided with rotary power at all times, possibly eliminating the need for the first power transmitting device 28, and the controller 42 can be configured to only reduce rotary power consumption of the compressor 30 when acceleration of the vehicle 10 is more important than operation of accessories.

For the sake of simplicity, in the description below of operations depicted in FIGS. 4, 5 and 6, it is assumed that in step S1 the controller 30 determined that only the second power transmitting device 40, and hence the compressor 30, is to be manipulated or have its operating condition changed when the controller 42 determines that acceleration is more important than powering accessories.

At step S2, the controller 30 determines the speed of the vehicle 10 via signals from the speed sensor 48 and determines the amount of acceleration being requested via signals from the accelerator sensor 50. Based on the conditions met when evaluating the data from the speed sensor 48 and the accelerator sensor 50, the controller 42 further determines whether or not acceleration of the vehicle 10 is more important than operation of accessories. One example of logic used to determine whether or not acceleration of the vehicle 10 is more important than operation of accessories is shown in FIG. 5 and is described in greater detail below.

As step S3 in FIG. 4, the controller 42 implements a change in the power level made available to the accessory or accessories based on the determination made in step S2. One example of the logic represented by step S3 is depicted in FIG. 6 and is also described in greater detail below.

Figure 5:
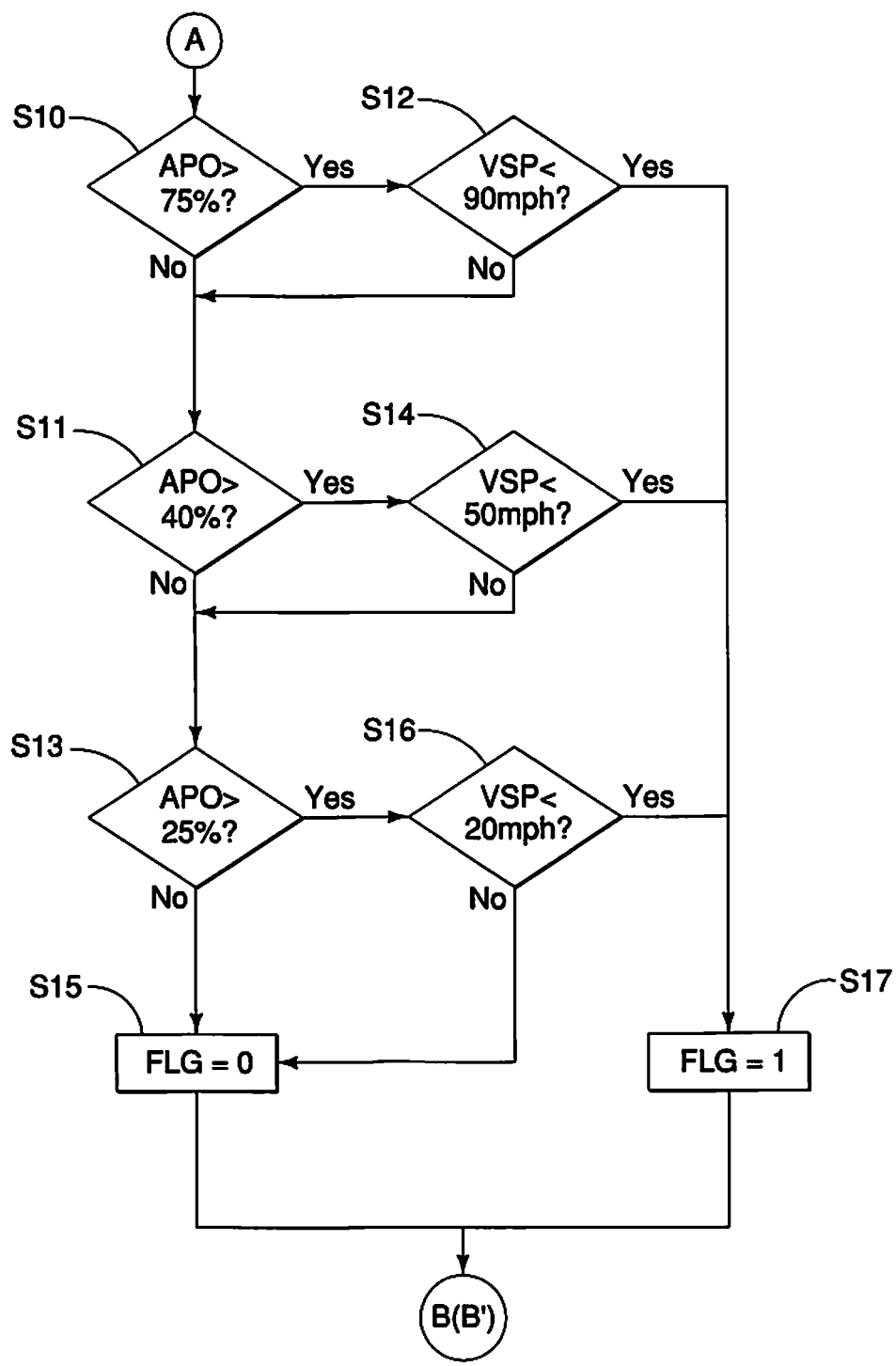
FIG. 5 is a flowchart showing logic used by the controller of the accessory power management assembly in a determination of whether or not acceleration is of greater importance than operation of accessories in accordance with the first embodiment.

A description is now provide of the logic shown in FIG. 5. The logic in FIG. 5 includes steps for determining which is of greater importance, acceleration of the vehicle 10 at the current speed of the vehicle 10, or providing power to the accessories at the first power consumption level, where full power is provided to the accessory. It should be understood from the drawing and the description herein that there are many different ways to determine the importance of acceleration vs. the operation of accessories. The logic presented in FIG. 5 is just one example of such logic based upon speed of the vehicle and the level of acceleration requested of the power plant 16.

The following acronyms are used in the description of FIG. 5 below. Specifically, APO is an abbreviation of Accelerator Pedal Opening and is a variable representing the signals sent from the accelerator sensor 50 and measurements of current levels of vehicle acceleration. If APO is equal to 100 percent, then APO indicates that acceleration requested by the vehicle operator is at a maximum. In other words, if APO is equal to 100 percent then the vehicle operator has pressed the acceleration pedal all the way to the floor (full throttle requested of the power device 16). If APO is equal to zero percent, then APO indicates that no acceleration has been requested by the vehicle operator. In other words, acceleration is at a minimum or the vehicle operator has his foot completely off the accelerator pedal.

VSP is an abbreviation of Vehicle Speed and is a variable representing the signals sent from the speed sensor 48 and measurements of levels of speed of the vehicle 10. FLG is merely a variable that is used to define the determination made by the controller 42 using the logic in FIG. 5. When FLG is made equal to one (1), the controller 42 has made the determination that at the current speed VSP of the vehicle 10 the current level of acceleration APO requested of the power device 16 is of greater importance than operating the accessory device at the first operating state. When FLG is made equal to zero (0) then the controller 42 has determined that at the current speed of the vehicle 10 the current level of acceleration requested of the power device 16 is not of greater importance than operating the accessory devices at the first operating state.

At step S10, the controller 42 checks the data from the accelerator sensor 50. If APO is equal to or less than 75%, then operation moves to step S11. If APO is greater than 75%, then operation moves to step S12. Movement to step S12 indicates that heavy acceleration has been requested of the power device 16 by the vehicle operator.

At step S11, the controller 42 further checks the data from the accelerator sensor 50. If APO is equal to or less than 40%, then operation moves to step S13. If APO is greater than 40%, then operation moves to step S14. Movement to step S14 indicates that a high level of acceleration that is less than the heavy acceleration level at step S10 and S12 has been requested of the power device 16 by the vehicle operator.

At step S13, the controller 42 further checks the data from the accelerator sensor 50. If APO is equal to or less than 25%, then operation moves to step S15. If APO is greater than 25%, then operation moves to step S16. Movement to step S16 indicates that a moderate level of acceleration less than the high level acceleration level at steps S11 and S14 has been requested of the power device 16 by the vehicle operator.

Returning to step S12, the value of APO at Step S10 was of a sufficient level to move to step S12. At step S12, the controller 42 reads the data from the speed sensor 48. If the vehicle speed VSP is equal to or greater than 90 miles per hour (mph) then operation moves to step S11. If the vehicle speed VSP is less than 90 mph then operation moves to step S17 here the variable FLG is made equal to 1 indicating that the acceleration of the vehicle 10 is more important than operation of accessories.

At step S14, the value of APO at Step S11 was of a sufficient level to move to step S14. At step S14, the controller 42 reads the data from the speed sensor 48. If the vehicle speed VSP is equal to or greater than 50 mph then operation moves to step S13. If the vehicle speed VSP is less than 50 mph then operation moves to step S17 here the variable FLG is made equal to 1 indicating that the acceleration of the vehicle 10 is more important than operation of accessories.

At step S16, the value of APO at Step S13 was of a sufficient level to move to step S16. At step S16, the controller 42 reads the data from the speed sensor 48. If the vehicle speed VSP is equal to or greater than 20 mph then operation moves to step S15 where the variable FLG is made equal to zero (0) indicating that the acceleration of the vehicle 10 is not as important than operation of accessories. If the vehicle speed VSP is less than 20 mph then operation moves to step S17 here the variable FLG is made equal to 1 indicating that the acceleration of the vehicle 10 is more important than operation of accessories.

The values of the variable APO in steps S10, S11 and S13 used by the controller 42 in the decision boxes shown in FIG. 5, and the values of the variable VSP in the decision boxes S12, S14 and S16 are merely examples of such values. The number values shown in the decision boxes S10-S14 and S16 are example values for demonstration purposes only. For example, for a vehicle having a power device 16 that has a modest horsepower output of, for example, less than 150 horsepower, the values of the variables APO and VSP will be compared with values that differ from values set for a vehicle having a power device 16 with a horsepower output of, for example, more than 300 horsepower. More specifically, the values of the accelerator measurement and vehicle speed that the variables APO and VSP are compared with and will differ from model to model. Specifically, the percentages indicated in steps S10, S11 and S13 are not limiting numbers and can vary from vehicle to vehicle and engine to engine. Similarly the speed (in miles per hour) indicated in steps S12, S14 and S16 can vary from vehicle to vehicle, and engine to engine.

At the bottom of FIG. 5, the logic presented designates the value of the variable FLG as being either zero (0) or one (1). If the value of FLG is made equal to zero in step S15, then the acceleration of the vehicle 10 is not more important than operation of accessories. If the value of FLG is made equal to one in step S17, then the acceleration of the vehicle 10 is more important than operation of accessories. The variable FLG is further used in the logic presented in FIG. 6.

At the bottom of FIG. 5, the letter B designates continuing logic in FIG. 6, as described further below with respect to the first embodiment. The letter B' designates continuing logic in FIG. 7 with respect to a second embodiment. In other words, the logic set forth in FIG. 5 is used in the first embodiment which continues in FIG. 6 and is also used in the second embodiment, shown in FIGS. 7 and 8 and described further herein below.

Figure 6:
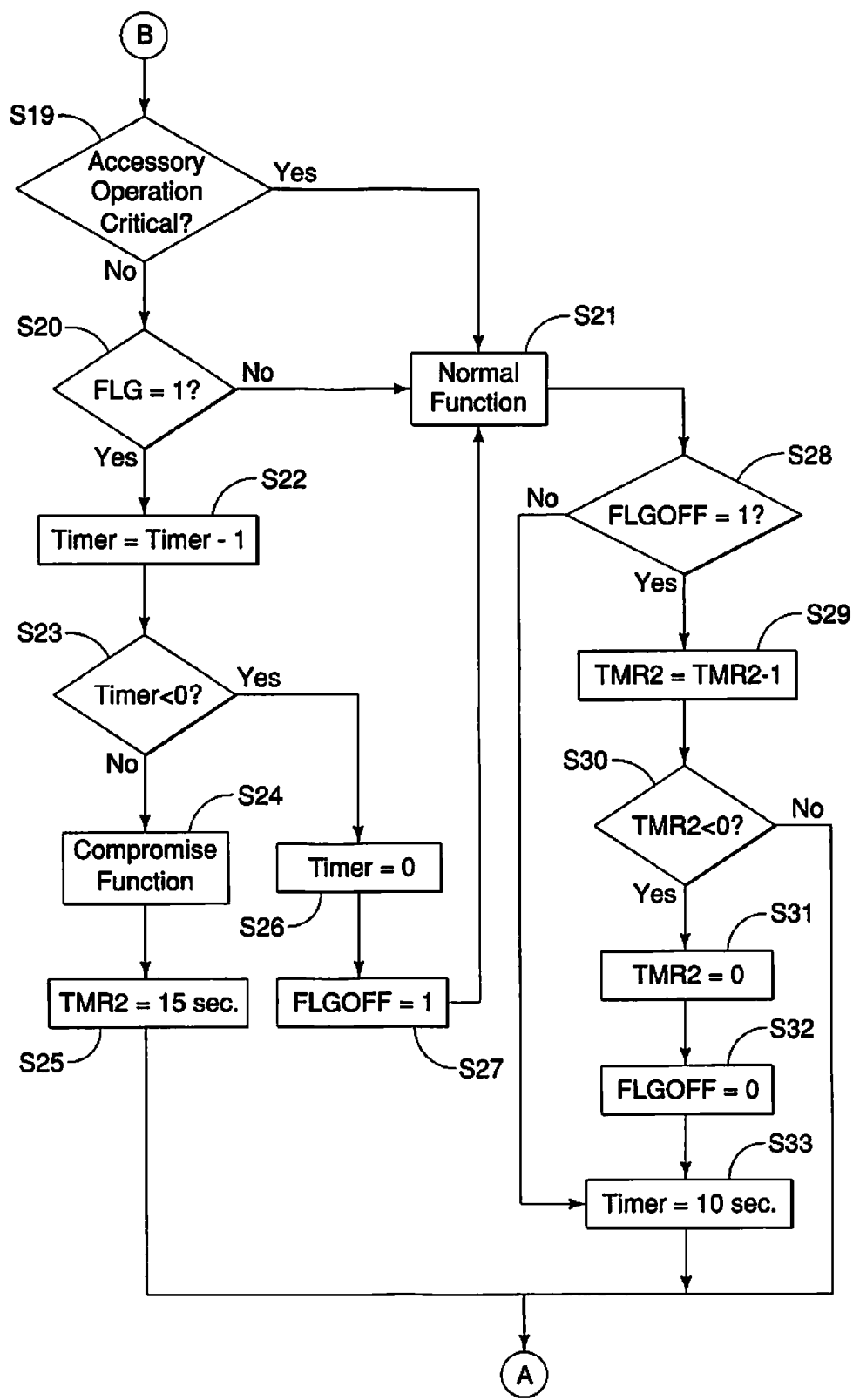
FIG. 6 is a flowchart showing logic used by the controller of the accessory power management assembly in a determination of timing of operation of the accessories in a first operation state and a second operation state in accordance with the first embodiment.

A description of one example of the operations of the controller 42 implementing changes to the power consumption level(s) of the second power transmitting device 40 is now described with specific reference to FIG. 6.

As shown in FIG. 6, the controller 42 continues operations at step S19 where the controller 42 determines whether or not accessory operation is critical or not. If accessory operation is critical, then operation moves to step S21, described further below. If accessory operation is not critical, then operation moves to step S20, as described further below. In step S19, the accessory operation can be deemed critical for any of a variety of reasons. There are many possible accessory operation critical circumstances. For example, if the controller 42 determines that significant demands are being made on electrical system of the vehicle 10, then the accessory operation is critical. Specifically, in a rain storm where wipers are operating, headlights are on, and the air conditioning system is being operated in a defogging mode to draw moisture from the air and off the windshield, would be one example of great demands being made of the alternator 18 and/or the battery 26. Another example of accessory operation critical circumstances include the controller 42 determining that the evaporator 34 is at such a high temperature that cooling is clearly required (for example, upon startup of the vehicle 10), overriding the need for reduction of power consumption on the power device 16.

Step S19 is an optional feature and can be omitted in some applications. Next at step S20, the controller 42 determines whether or not the variable FLG has previously been made equal to one (1). At step S20, if FLG is not equal to one, then operation moves to step S21, where operation of the accessory continues in a normal power level function. The normal power level function corresponds to the first operating state where the compressor 30 is operated with the second power transmitting device 40 at the first power consumption level (i.e., with the electromagnetic clutch engaged to receive rotary power from the power device 16).

At step S22, the controller 42 sets redefines a variable Timer to be incrementally reduced (Timer=Timer−1). The variable Timer represents a time period that defines a length of time during which the controller 42 can operate the second power transmitting device 40 in the second operating state where the compressor 30 has a reduced (or eliminated) level of rotary power provided from the power device 16 while the power device 16 undergoes acceleration. The variable Timer is initially defined as being equal to 10 seconds, as is further explained below with respect to step S33. However, it should be understood from the drawings and the description herein that the variable Timer can be defined initially to any length of time, depending on the design of the vehicle 10 and the capacity of the air conditioning system 20. For example, in a vehicle 10 with a power device 16 that produces a lower level of horsepower, it can be advantageous to initialize the variable Timer as being 15 seconds or 20 seconds to give the power device 16 plenty of time to undergo acceleration. In a vehicle with a power device 16 that produces a large level of horsepower, the variable Timer can be initialized as being only 5 seconds or 10 seconds since the power device 16 may not need a long period of time to undergo acceleration and achieve a desired vehicle speed. In other words, although FIG. 6 shows the variable Timer as being initialized as being 10 seconds in step S33, the 10 second value is merely one example of the initialization of the variable Timer. The variable Timer can be initialized to a value that can vary from model to model.

Next, operation moves to step S23. At step S23, the controller 42 determines whether or not Timer is less than zero. If the variable Timer is not less than zero, operation moves to step S24 where the controller 42 operates the second power transmitting device 40 in a compromise mode (compromise operating condition). In the first embodiment, the compromise mode corresponds to operating the second power transmitting device 40 in the second operating state where the second power transmitting device 40 is not operated. Hence, in the second operating state, the second power consumption level is such that the electromagnetic clutch that defines the second power transmitting device 40 is turned off. Therefore, no rotary power is transmitted between the power device 16 and the compressor 30.

At step S23, if the variable Timer is less than zero, operation moves to step S26, as is described further below.

After step S24, operation moves to step S25. At step S25, another variable TMR2 (also referred to as Timer2) is defined as being equal to, for example, 15 seconds. The variable TMR2 is defined for the purpose of subsequently temporarily operating the second power transmitting device 40 in the first operating state in the event that acceleration continues beyond the time allotted for the variable Timer. Specifically, if the vehicle operator is operating the vehicle 10 with a high level of acceleration for an extended period of time, and the air conditioning system 20 is operating, after the initialized value for the variable Timer has expired, the controller 42 overrides the demand for acceleration with reduced power to the accessories, and for the period of time designated in the variable TMR2, the accessories are operated. At the expiration of the time period assigned to the variable TMR2, the controller 42 again operates the second power transmitting device 40 in the second operating state. A basic purpose of the variable TMR2 is to provide recovery time for accessory function. For example, if the need for cooling or replenishing of battery power becomes more important than the acceleration event, the variable TMR2 allows for a way for the accessory function to recover.

As with the initialized value of the variable Timer, the length of time assigned to the variable TMR2 varies from model to model. In the embodiment depicted in FIG. 6, the variable TMR2 is initialized with a value of fifteen seconds (15 sec.). This value is just one example of the variable TMR2. For example, in a vehicle with an air conditioning system with a large cooling capacity (and a correspondingly powerful compressor), it may only be necessary to initialize the variable TMR2 with a value of five seconds or ten seconds. Conversely, in a vehicle with an air conditioning system with a generally small cooling capacity (and a correspondingly low power compressor), it may be necessary to initialize the variable TMR2 with a value of fifteen seconds or twenty seconds.

After step S25, operation moves back to the operation in FIG. 5.

Returning to step S23, if the variable Timer is less than zero, operation moves to step S26. At step S26, the variable timer is made equal to zero and operation moves to step S27. At step S27, the variable FLGOFF is made equal to one (FLGOFF=1).

The variable FLGOFF is made equal to one at the end of the time period defined by the variable Timer. During the steps where the value of the variable Timer is incremental diminished (iterations of the logic at step S22), the controller 42 operates the second power transmitting device 40 in the second operating state (the compromise mode or compromise operating condition) such that the compressor 30 is not provided with rotary power. At the end of the time period defined by the variable Timer, the value of FLGOFF determines whether or not the controller 42 is to temporarily restore operation of the second power transmitting device 40 in the first operating state.

After step S27 where the variable FLGOFF is made equal to one, normal operation of the compressor 30 is restored at step S21 for the period of time designated by the variable TMR2.

At step S28, the controller 42 checks the value of the variable FLGOFF. If FLGOFF is equal to one (FLGOFF=1) operation moves to step S29. At step S29, the value of the time related variable TMR2 is incremented down by one second (TMR2=TMR2−1).

Next at step S30, the controller 42 determines whether or not the variable TMR2 is less than zero (TMR2<0?). If the variable TMR2 is less than zero, then the period of time designated for temporarily operating the second power transmitting device 40 in the first operating state has ended. Therefore, operation moves to step S31 where the variable TMR2 is re-defined as being equal to zero (TMR2=0). Operation then moves to step S32 where the variable FLGOFF is defined as being equal to zero (FLGOFF=0). Operation then moves to step S33.

At step S30, if the variable TMR2 is not less than zero operation returns to FIG. 5 for the next iteration of the logic.

Returning to step S28, if the controller 42 determines that the value of the variable FLGOFF is not equal to one (FLGOFF≠1) operation also moves to step S33. At step S33, the variable Timer is re-defined as being equal to ten seconds (Timer=10 sec.) and operation returns to the steps in FIG. 5. Thereafter, if acceleration still continues to be of importance, upon the next iteration of the presented example of the logic used by the controller 42, the controller 42 resumes operating the second power transmitting device 40 in the second operating state.

In the logic described above, the first power transmitting device 28 and the second power transmitting device 40 are characterized as being electromagnetic clutches that transmit full rotary power to the accessories (the alternator 18 and the compressor 30) or disconnect the accessories completely from the power device 16 such that the accessories are no longer operated. In other words, in the first embodiment, in the first operating state the first power consumption level represents full power being transmitted to the accessories and in the second operating state the second power consumption level represents no power being transmitted to the accessories.

It should be understood from the logic presented in FIGS. 5 and 6 that alternative devices can be used as the power transmitting devices. Specifically, conventional electromagnetic clutches discussed above can be replaced with devices that establish the first power consumption level as transmitting full power to the accessories, but establish the second operating state such that the second power consumption level as transmitting a reduced amount of rotary power to the accessories. In other words, the accessories are always provided with at least some rotary power in alternative embodiments, such as those described in greater detail below.

The vehicle accessory power management assembly 22 is configured such that when a vehicle operator makes acceleration demands on the power device 16 that can be difficult to achieve with accessories operating, the controller 42 eliminates or reduces the energy draw of the accessories by temporarily changing the level of power drawn by the accessories from the power plant 16. Thus, when the vehicle operator requests heavy acceleration from the power device 16, the power device 16 is able to more easily achieve the current acceleration demands.

Second Embodiment

Figure 7:
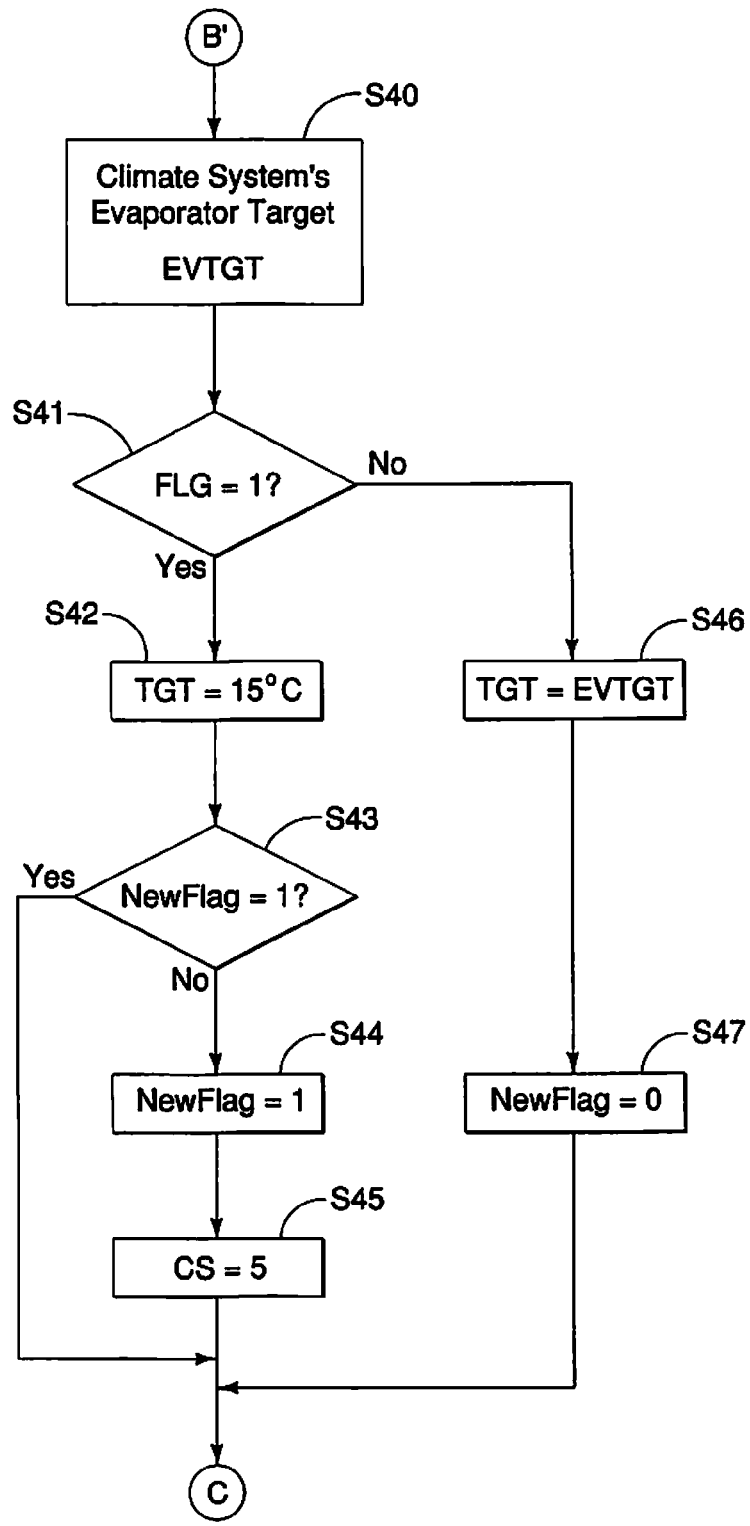
FIG. 7 is a flowchart showing logic used by the controller of the accessory power management assembly when adjusting or changing compression stroke of a variable stroke compressor in accordance with a second embodiment.
Figure 8:
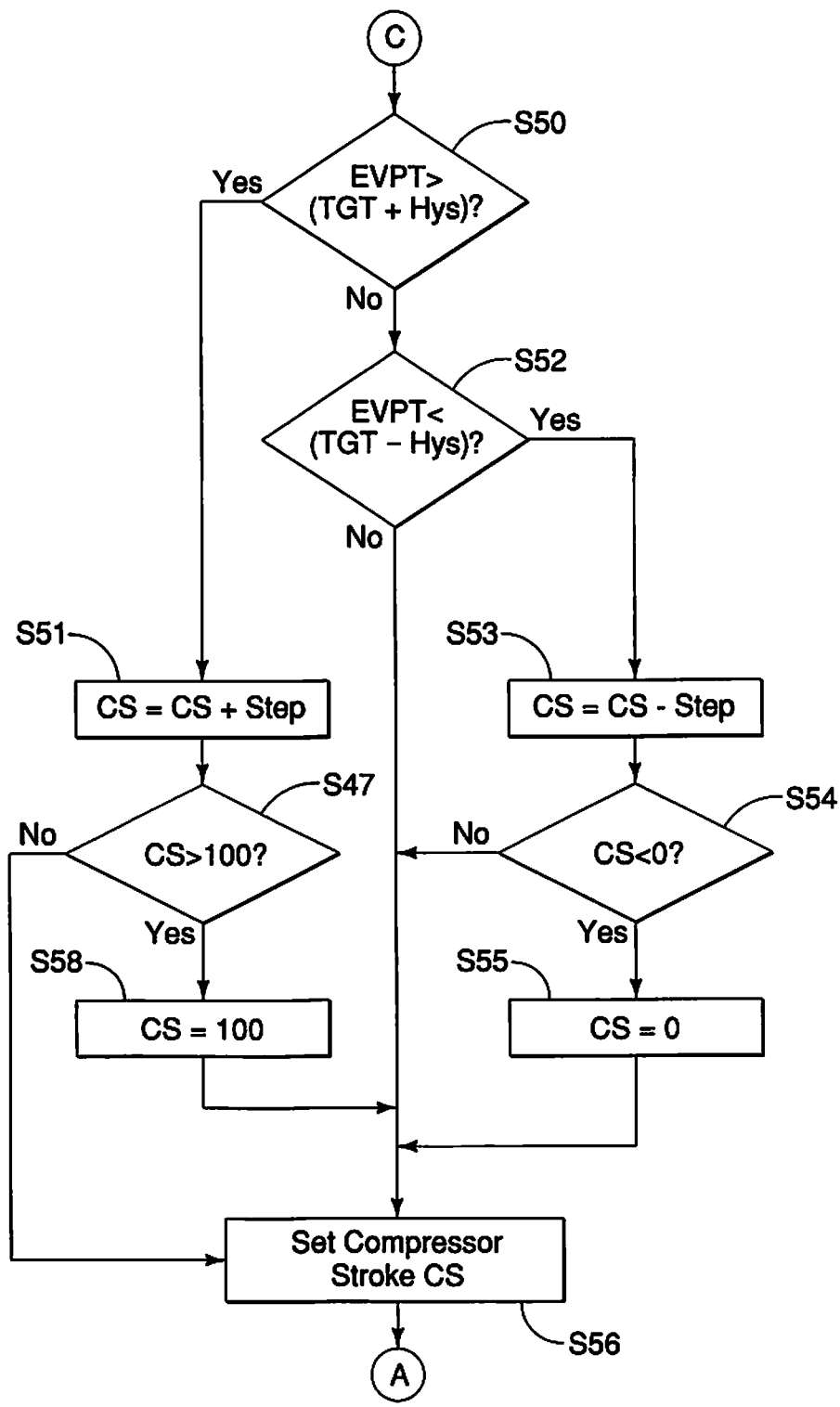
FIG. 8 is a flowchart showing continuing logic used by the controller of the accessory power management assembly when adjusting or changing compression stroke of a variable stroke compressor in accordance with the second embodiment.
Figure 9:
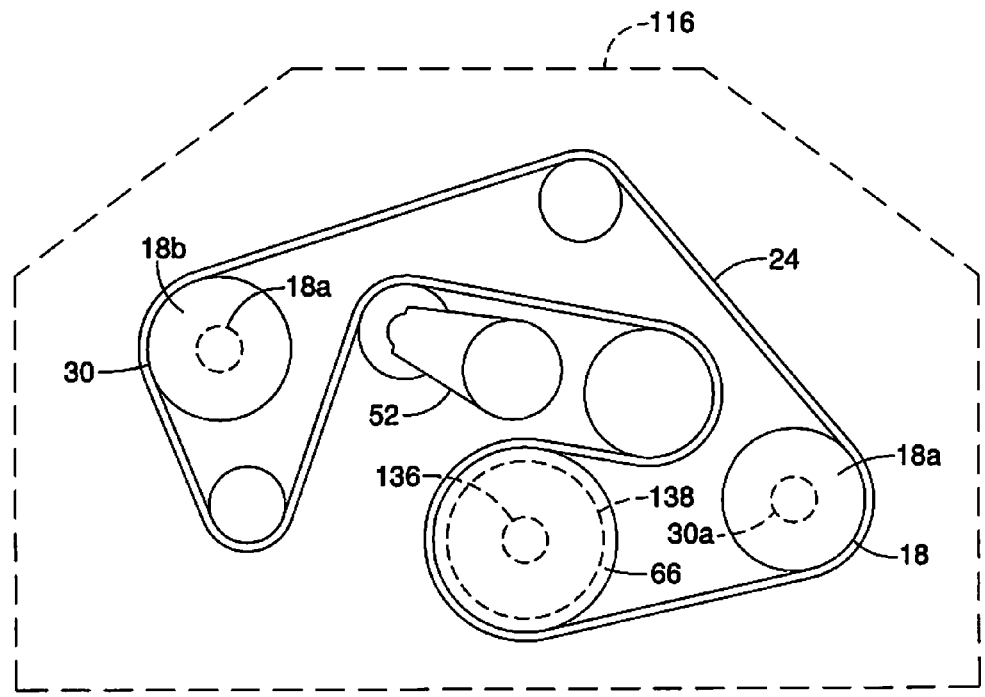
FIG. 9 is a schematic view of a front of a power device that includes a accessory power management assembly, showing a power transmitting device controlled by the accessory power management assembly with a pulley and drive belt arrangement that provides rotary power to the accessories of the vehicle in accordance with a third embodiment.

Referring now to FIGS. 5, 7 and 8, logic used in a vehicle accessory power management assembly 22 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The logic presented in FIG. 5 remains unchanged from the description above with respect to the first embodiment. Therefore, for the sake of brevity, the description of the logic presented in FIG. 5 is not repeated here.

In the second embodiment, the compressor 30 is a variable compression stroke compressor such that an electromagnetic clutch is not necessary in order to change power consumption levels between the first operating state and the second operating state of the compressor 30. Rather, the stroke length of pistons that compress refrigerant can be changed in many variable stroke compressors. Variable compressors are conventional devices, such as those disclosed in, for example, U.S. Pat. No. 8,196,506 and U.S. Pat. No. 7,972,118, which are incorporated herein by reference in their entirety.

One aim of the vehicle accessory power management assembly in accordance with the second embodiment is to integrate the driving demand needs into the evaporator temperature management for a variable compressor. Currently with an air conditioning system operating, the evaporator is managed to a target temperature that requires some pumping load to meet cabin comfort that is largely independent of the driving situation. Small transient acceleration demands, such as passing maneuvers or pulling into traffic, are compromised by the energy load demands of the compressor 30. This is particularly evident in vehicles having small engine. In the second embodiment, the controller 42 is configured to reduce compressor power consumption during transient driving circumstances in a manner that better optimizes the combination of cabin comfort needs and acceleration performance.

In the second embodiment and specifically in FIGS. 7 and 8, several variables are referred to. The variable EVPT represents the current temperature at or downstream from the evaporator 34 as measured by the temperature sensor 44.

The variable EVTGT is a target temperature set by the air conditioning system 20 that corresponds to a temperature at the evaporator 34 necessary such that air passing over cooling surfaces of the evaporator 34 are adequately cooled to a temperature that provides comfort to the passenger compartment 14 and achieves a temperature in the passenger compartment set by a vehicle passenger or the vehicle operator.

The variable TGT is a temporary target temperature that is temporarily redefined in FIG. 7 to either the value of the variable EVTGT (step S46) or is set to an arbitrarily high value (step S41) so that in subsequent iterations of the logic the power consumption of the compressor 30 can be reduced during acceleration events.

The variable Hys is a simple hysteresis number that is determined on a model to model basis. The variable Hys is used by the controller 42 in a comparison of the variable TGT with the variable EVPT. Specifically, the variable EVPT is compared with the value of TGT plus or minus the variable Hys.

The variable CS corresponds to the current stroke of the variable stroke compressor (the compressor 30). The compressor stroke CS is adjustably set by the controller 42 anywhere within a range from zero (0) where little or no refrigerant is compressed, to 100 where a maximum amount of refrigerant is compressed.

The variable Step is used to redefine the value of the compressor stroke variable CS. The value of the variable Step is determined on a model to model basis and can vary in values from two (2) to ten (10).

In the second embodiment, the air conditioning system 20 operates the compressor 30 to maintain temperature at the evaporator 34 (represented by the variable EVTGT) such that the passenger compartment 14 is maintained at a comfortable temperature. When the controller 42 determines that acceleration is of greater importance than operation any accessories (FIG. 5), then the compressor 30 (a variable stroke compressor) is "de-stroked" until an elevated evaporator temperature is reached which is still acceptable for passenger compartment comfort. At that time, the air conditioning system 20 controls the compressor 30 to maintain the evaporator 34 at an elevated evaporator temperature. The stroke of the compressor 30 is returned to normal operation, with a lower target evaporator temperature, when controller 42 determines that acceleration is no longer more important than operation of accessories.

In the second embodiment, the second power transmitting device 40 is the stroke adjusting mechanism of the variable stroke compressor (the compressor 30).

The logic set forth in FIGS. 5, 7 and 8 is used by the controller 42 to first determine whether or not acceleration is of more importance than accessory operation (FIG. 5) and manipulate the variable stroke mechanism (the second power transmitting device 40) of the compressor 30 in order switch operation of the compressor 30 between the first operating state and the second operating state (FIGS. 7 and 8).

In the second embodiment, the first operating state is such that the compressor 30 is operated at a first power consumption level as per normal operating protocols of the air conditioning system 20. Specifically, a passenger or vehicle operator sets a target temperature that corresponds to comfort in the passenger compartment 14. The controller 42 then determines the evaporator temperature EVTGT (a target temperature) for the evaporator 34 in a conventional manner and operates the compressor 30 accordingly to maintain the evaporator temperature EVTGT.

In order to operate the compressor 30, the controller 42 changes the compressor stroke CS within a range from zero (0) where little or no refrigerant is compressed, to 100 where a maximum amount of refrigerant is compressed.

In FIG. 7, the controller 42 basically redefines the value of the variable TGT used in below FIG. 8. If acceleration is more important than the operation of the accessories, then TGT is defined with a preset large value. The preset value of TGT is 15° C. in FIG. 7 (see step S42). However, it should be understood that the preset value of TGT can vary from model to model. The present value of TGT can vary from between 5° C. to 20° C. In other words, the value depicted in FIG. 7 at step S42 is merely one example of a preset value of the variable TGT.

The logic set forth in FIG. 7 proceeds after the logic presented in FIG. 5. Specifically, all the steps in FIG. 5 are acted upon by the controller 42, and thereafter, the controller 42 proceeds to the logic in FIG. 7 in the second embodiment. At step S40 in FIG. 7, the controller 42 confirms the target value of the variable EVTGT which is determined based upon the input to the air conditioning system 20 (climate system) by a vehicle passenger or vehicle operator. In the absence of acceleration of the vehicle 10, the air conditioning system 20 operates the compressor 30 to achieve the target temperature corresponding the value of the variable EVTGT. At step S41, the controller 42 determines whether or not the variable FLG is equal to one (1). If at step S41 the controller 42 determines that the variable FLG is equal to one (1), then operation moves to step S42. The value of the variable FLG equal to one (1) indicates that acceleration is more important than operation of accessories.

At step S42, the variable TGT used in the logic shown in FIG. 8 is redefined as being equal to the preset value of 15° C. Next in step S43, the controller 42 determines whether or not the variable NewFlag is equal to one (1). The variable NewFlag is a variable that signifies whether or not the value of CS has been reduced to a low value corresponding to the second operating state (the second power consumption level that is lower than the first power consumption level).

If the controller 42 determines at step S43 that the variable NewFlag is equal to one (1), then operation moves to the bottom of FIG. 7 and moves to the logic in FIG. 8.

If the controller 42 determines at step S43 that the variable NewFlag is not equal to one (1), then operation moves step S44 where the variable NewFlag is made equal to one (1). After step S44, operation moves to step S45 where the compressor stroke CS is redefined at a low value of 5 corresponding to the second operating state (the second power consumption level that is lower than the first power consumption level). Hence, the logic in S44 and S45 reduces the compressor stroke CS to a low value thereby rapidly reducing power load of the compressor 30 in order to improve acceleration response, rather than waiting for the logic in FIG. 8 to reduce the load of the compressor 30.

Returning to step S41 if the controller 42 determines that the variable FLG is not equal to one (1), then operation moves to step S46. This indicates that there is no acceleration event or that acceleration is less important than operating the accessories. At step S46 the value of the variable TGT is made equal to the variable EVTGT such that control of the power consumption level of the compressor 30 will be determined based upon cooling needs rather than power consumption needs.

Next at step S47, the variable NewFlag is redefined as being equal to zero (0). Thereafter, operation moves to the logic in FIG. 8.

FIG. 8 depicts logic used by the controller 42 to operate the compressor 30 and the second power transmitting device 40 (the de-stroking device of the variable stroke compressor).

At the top of FIG. 8, the operation has completed the logic presented in FIG. 7 and the controller 42 has determined the value of the variable FLG, as described above with respect to FIG. 5 in the first embodiment. Regardless of the value of the variable FLG, the logic shown in FIG. 8 can re-define the value of the compressor stroke CS depending upon the values of the variables EVPT and TGT, as described below.

At step S50, the controller 42 evaluates the temperature EVPT at the evaporator 34 as measured by the temperatures sensor 44. The controller 42 determines whether or not the measured temperature EVPT is greater than the current value of the target temperature TGT. If the variable EVPT is greater than the target temperature TGT plus Hys (EVPT>(TGT+Hys)), then operation moves to step S51.

At step S51, the controller 42 redefines the compressor stroke CS upward by the value of the variable Step (CS=CS+Step). This action increases the compressor stroke CS such that a greater amount of refrigerant is compressed, thereby increasing cooling capability.

Returning to step S50, if the controller 42 determines the variable EVPT is not greater than the target temperature TGT plus Hys (EVPT>(TGT+Hys)), then operation moves to step S52. At step S52, the controller determines whether or not the variable EVPT is less than the target temperature TGT minus Hys (EVPT<(TGT−Hys)). At step S52, if the controller 42 determines the variable EVPT is less than the target temperature TGT plus Hys (EVPT<(TGT+Hys)), then operation moves to step S53.

At step S53, the controller 42 redefines the compressor stroke CS downward by the value of the variable Step (CS=CS−Step). This action decreases the compressor stroke CS such that a lesser amount of refrigerant is compressed, thereby decreasing cooling capability and decreasing the amount of power drawn by the compressor 30 from the power device 16.

Next at step S54, the controller 42 determines whether or not the compressor stroke CS is less than zero (CS<0). If the controller 42 determines that the compressor stroke CS is less than zero (CS<0), then operation moves to step S55 where the value of CS is re-defined as being zero thereby eliminating or completely stopping the compression of refrigerant by the compressor 30. Thereafter, operation moves to set S56.

Further, at step S54, if the controller 42 determines that the compressor stroke CS is not less than zero (CS<0), then operation also moves to step S56.

Returning to step S52, if the controller 42 determines the variable EVPT is not less than the target temperature TGT minus Hys (EVPT<(TGT−Hys)), then operation moves also to step S56.

Returning to step S51, the controller moves to step S57 after the step S51. At step S57, the controller 42 determines whether or not the compressor stroke CS is greater than 100 (CS>100). If the controller 42 determines that the compressor stroke CS is greater than 100, then operation moves to step S58 where the value of CS is re-defined as being 100 thereby causing the compressor 30 to operate at full capacity compressing a maximum level refrigerant. Thereafter, operation moves to set S56.

At step S57, if the controller 42 determines that the compressor stroke CS is not greater than 100, then operation moves to step S56. At step S56, the controller 42 implements the current value of the compressor stroke CS by setting the compressor 30 to operate at the set stroke value.

After step S56, operation moves to the logic set forth in FIG. 5 for a further iteration of the logic presented in each of FIGS. 5, 7 and 8.

In the logic presented in the second embodiment, which includes FIGS. 5, 7 and 8, the controller 42 uses signals from the speed sensor 48 and the accelerator sensor 50 to switch a switching part of the second power transmitting device 40 (and the first power transmitting device 28) from the first operating state to the second operating state in response determining that at the current speed of the vehicle 10 the current level of acceleration requested of the power device 16 is of greater importance than operating the accessory device at the first operating state. In the second embodiment, the first operating state, the compressor 30 (a variable stroke compressor) is operated at a first power consumption level where the amount of refrigerant compressed by the compressor 30 adjusted in response to the cooling needs of the air conditioning system 20. In the second operating state, the compressor 30 is operated by the controller 42 in a second power consumption level that is lower than the first power consumption level. In the second operating state, the controller 42 initially reduces the refrigerant compressing capacity of the compressor 30 (see step S45 in FIG. 7) in order to reduce the power consumption level of the compressor 30 and allow the power device 16 to achieve the requested acceleration.

Third Embodiment

Referring now to FIGS. 9-16, a power device 116 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The power device 116 is basically the same as the power device 16 described above with respect to the first embodiment, and includes an alternator 18 and an air conditioning system 20 with a compressor 30. As shown schematically in FIG. 9, the power device 116 includes an output shaft 136, a power transmitting device 138 attached to the output shaft 136, a belt tensioner 52 and a drive belt 24. The power device 16 is configured to produce rotary power (torque) that powers a drive train (not shown) and propels wheels of the vehicle 10. Further, the output shaft 136 of the power device 16 provides rotary power to the accessories of the vehicle 10, such as the alternator 18 and the compressor 30 via the drive belt 24.

Figure 10:
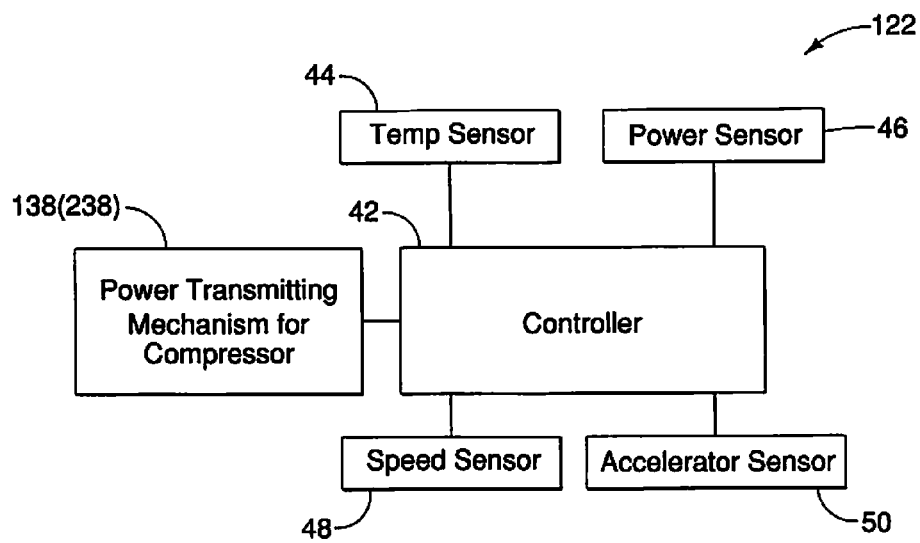
FIG. 10 is a schematic block diagram of the elements of the accessory power management assembly, including the controller in accordance with the third embodiment.

As shown schematically in FIG. 10, the power device 116 includes a vehicle accessory power management assembly 122 includes the controller 42, the temperature sensor 44, the power sensor 46, the speed sensor 48 and the accelerator sensor 50 as described above with respect to the first embodiment. The controller 42 is also connected to the power transmitting device 40. The controller 42 uses data received from selected ones of the temperature sensor 44, the power sensor 46, the speed sensor 48 and the accelerator sensor 50 in order to control operation of the power transmitting device 138 in a manner consistent with the first embodiment, except that the controller 42 only controls the state of a single power transmitting device 138. In other words as described in greater detail below, in the third embodiment, the power transmitting device 138 replaces the first and second power transmitting devices 28 and 40 of the first embodiment.

The alternator 18 is accessory device directly supported to or on the power device 116 and has an input shaft 30a with a pulley 30b fixed thereto. The drive belt 24 engages the pulley 30b such that the alternator 18 can be provided with rotary power from the power device 116.

The compressor 30 is accessory device directly supported to or on the power device 116 and has an input shaft 32a with a pulley 32b fixed thereto. The drive belt 24 engages the pulley 32b such that the compressor 30 can be provided with rotary power from the power device 116.

A description of the power transmitting device 138 in accordance with a third embodiment is now provided with specific reference to FIGS. 11-16. The power transmitting device 138 has an input part 60, an output part 62, a speed ratio switching part 64 and a pulley 66. In the first embodiment, the input part 60 is, for example, a bolt or shaft that is directly coupled to the output shaft 136 of the power device 16 directly receiving rotational power therefrom. In other words, the input part 60 rotates in unison with the output shaft 136 of the power device 16. In the first embodiment, the input part 60 is fixedly attached to the output shaft 136 as a threaded mechanical fastener, but can alternatively be unitarily formed with the output shaft 136 of the power device 16 or press-fitted to the output shaft 136.

The output part 62 is, for example, a front carrier plate that is secured to the pulley 66 for rotation therewith. In other words, the output part 62 and the pulley 66 rotate in unison at the same speeds. Since the pulley 66 is engaged by the drive belt 24 and the drive belt 24 wraps around the pulley 30b and the pulley 32b, the output part 62 is directly coupled to the input shaft 30a of the alternator 18 and the input shaft 32a of the compressor 30 via the drive belt 24 providing rotary power thereto when the power device 16 is operating.

The speed ratio switching part 64 includes an electromagnetically actuated clutch 68 and a sun gear of a planetary gear device 70.

Figure 11:
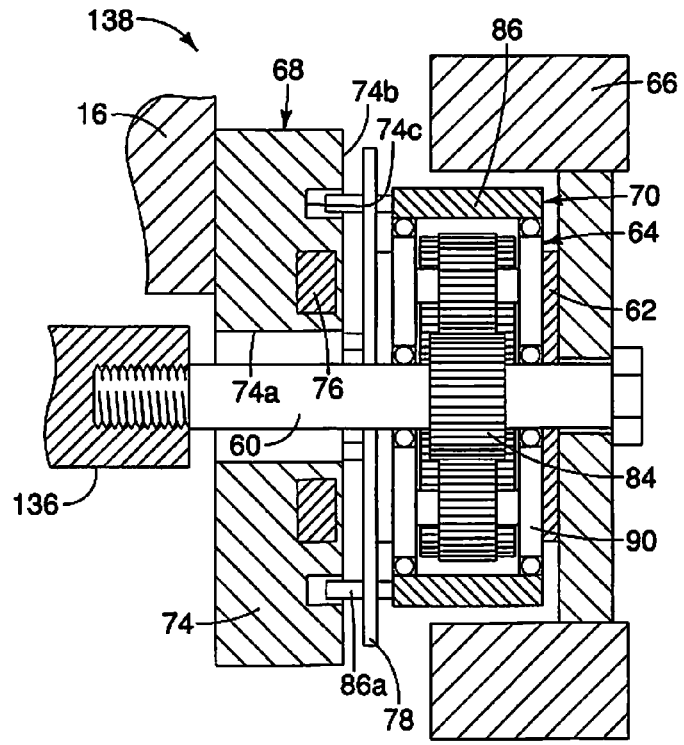
FIG. 11 is a schematic cross-sectional view of the power transmitting device supported by the power device showing details of an electromagnetically actuated clutch, a planetary gear device and a pulley, with a clutch plate of the electromagnetically actuated clutch in a first operating state (a disengaged orientation) in accordance with the third embodiment.
Figure 12:
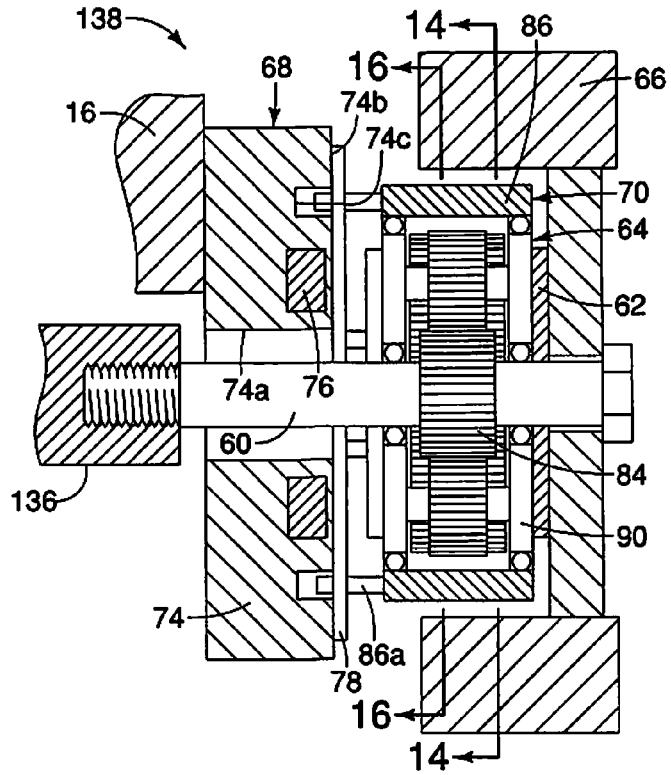
FIG. 12 is another schematic cross-sectional view of the power transmitting device similar to FIG. 11, showing the clutch plate of the electromagnetically actuated clutch in a second operating state (an engaged orientation) in accordance with the third embodiment.
Figure 13:
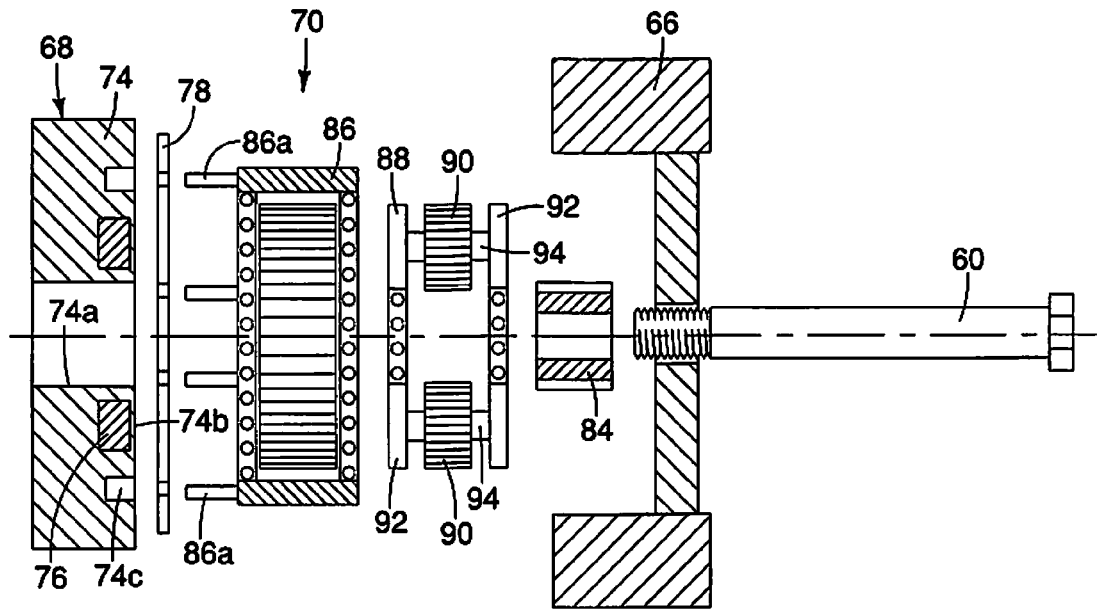
FIG. 13 is a schematic exploded cross-sectional view of the power transmitting device showing details of the electromagnetically actuated clutch and the planetary gear device in accordance with the third embodiment.
Figure 14:
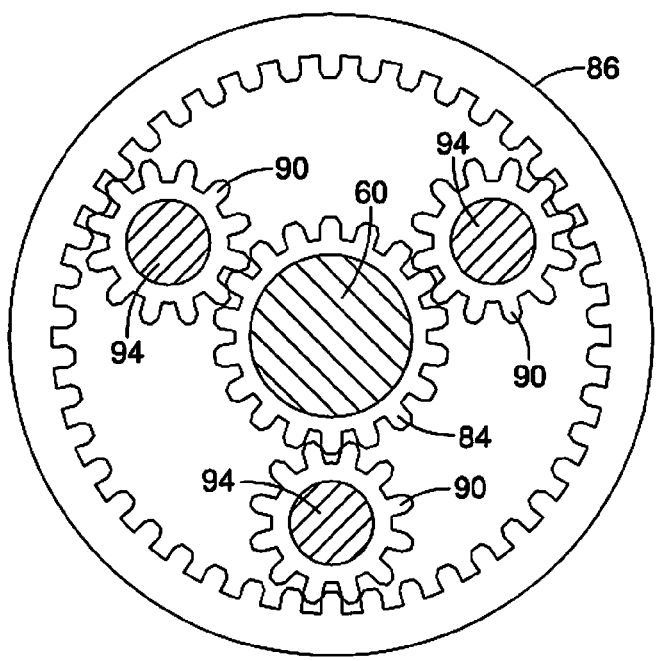
FIG. 14 is a schematic cross-sectional view of the planetary gear device of the power transmitting device taken along the line 14-14 in FIG. 12 in accordance with the first embodiment.
Figure 15:
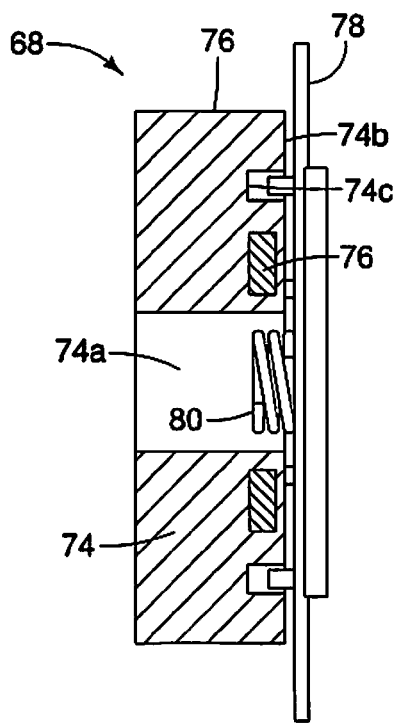
FIG. 15 is a cross-sectional view of the electromagnetically actuated clutch in accordance with the third embodiment.

As shown removed from the power transmitting device 138 in FIG. 15, the clutch 68 basically includes a base member 74, an electromagnet 76, a clutch plate 78 and a biasing member 80. The base member 74 is an annular shaped member that includes an annular recess that receives the electromagnet 76 and, as shown in FIGS. 11 and 12, also includes a central opening 74a through which the input part 60 extends. The base member 74 also defines a clutch surface 74b that is shaped and formed to engage the clutch plate 78 in a conventional manner. The clutch surface 74b can also include an annular concave portion 74c, as described in greater detail below.

As shown in FIGS. 11 and 12, the base member 74 of the clutch 68 is fixedly attached to the power device 116 (for example, the clutch 68 is bolted or otherwise non-movably fixed to an engine block of the power device 116). The base member 74 basically encircles the output shaft 136 of the power device 116 with the central opening 74a being aligned with a central axis of the output shaft 136. Hence, the base member 74 of the clutch 68 is non-movable relative to the power device 16. As shown in FIGS. 11 and 12, the clutch plate 78 is movable between a dis-engaged orientation (FIG. 11) and an engaged orientation (FIG. 12). Specifically, when the controller 42 causes the electromagnet 76 to be turned on (to generate an electromagnetic field), the clutch plate 78 is pulled into engagement with the clutch surface 74b of the base member 74 in a conventional manner. When the controller 42 causes the electromagnet 76 to be turned off (no electromagnetic field being generated), the clutch plate 78 is released and moves into engagement with the planetary gear device 70 in a manner described further below. The clutch plate 78 is moved away from the base member 74 via biasing force of the biasing member 80. The biasing member 80 has a first end with a bearing (not shown) that contacts either the power device 16 or the output shaft 136 and a second end in contact with the clutch plate 78 in a conventional manner. Since electromagnetically controlled clutches, such as the clutch 68 are conventional structures, further description is omitted for the sake of brevity.

Figure 16:
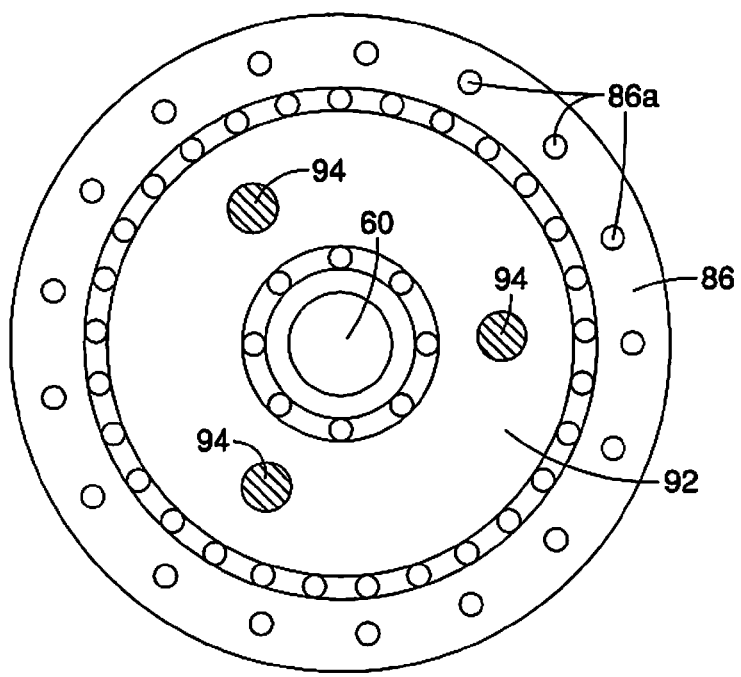
FIG. 16 is another cross-sectional view of the planetary gear device taken along the line 16-16 in FIG. 12 in accordance with the third embodiment.

A description of the planetary gear device 70 is now provided with specific reference to FIGS. 11-12 and 16. The planetary gear device 70 basically includes a sun gear 84, a ring gear 86, a planet gear carrier assembly 88 and planet gears 90.

The sun gear 84 is fixed to the input part 60 for rotation therewith. For example, the sun gear 84 can be press-fitted to the shaft of the input part 60, or can be provided with a keyway and fastener arrangement. Since the input part 60 is fixed to the output shaft 136 of the power device 16, the sun gear 84, the input part 60 and the output shaft 136 of the power device 16 all rotate together in unison as a single structure.

The ring gear 86 is an annular shaped member that includes gear teeth along its inner annular surface and a plurality of pins 86a that extend through apertures formed in the clutch plate 78. The pins 86a are rigidly fixed to the ring gear 86 by, for example, press-fitting engagement. The clutch plate 78 can move in an axial direction relative to a rotational axis thereof along the pins 86a. In other words, the clutch plate 78 is fixed to the ring gear 86 for rotation therewith but the clutch plate 78 can move between the dis-engaged orientation (FIG. 11) and the engaged orientation (FIG. 12) along the pins 86a relative to the ring gear 86, but cannot rotate relative to the ring gear 86. The pins 86a extend into the annular concave portion 74c of the base member 74, but do not contact the base member 74. Alternatively, the pins 86a can be made shorter so that they do not extend beyond the clutch plate 78 with the clutch plate 78 in the engaged orientation (FIG. 5).

The planet gear carrier assembly 88 basically includes carrier plates 92 and shafts 94. The carrier plates 92 are connected to one another by the shafts 94, which are rigidly fixed therebetween. The planet gears 90 are installed to the shafts 94 and rotate freely about the shafts 94.

As mentioned above, the clutch plate 78 and the ring gear 86 are coupled to one another via the pins 86a such that they rotate together as a single body. The sun gear 84 is fixed to the input part 60 such that sun gear 84 rotates with the output shaft 136. The planet gear carrier assembly 88 is supported within the ring gear 86 via, for example, bearings and is further supported on the input part 60 via additional bearings, such that, absent other forces, the planet gear carrier 88 and planet gears 90 can rotate within the ring gear 86 and around the sun gear 84. The planet gear carrier 88 (specifically, one of the carrier plates 92) is fixedly attached to the pulley 66 via the output part 62 for rotation therewith. In other words, the pulley 66, the output part 62 and the planet gear carrier 88 all rotate together as a single body. Alternatively, the output part 62 can be eliminated and the planet gear carrier 88 directly attached to the pulley 66, such that the planet gear carrier 88 defines the output part 62.

Consequently, when the clutch plate 78 is in the dis-engaged orientation (FIG. 10), the clutch plate 78 and the ring gear 86 are free to rotate relative to the power device 16. Further the clutch plate 78 locks the ring gear 86 to the planet gear carrier 88 when the clutch plate 78 is in the dis-engaged orientation (FIG. 11). As a result, the sun gear 84 and the ring gear 86 are locked together. Hence, the output shaft 136 of the power device 16 and the pulley 66 rotate at the same speed. With the clutch plate 78 in the disengaged orientation (FIG. 12), the power transmitting device 138 operates in a first operating state where the output shaft 136 of the power device 16 and the pulley 66 rotate at the same speed.

When the clutch plate 78 is in the engaged orientation (FIG. 12) the clutch plate 78 and the ring gear 86 are prevented from rotating relative to the power device 16. As a result, the sun gear 84 causes the planet gears 90 to rotate relative to the ring gear 86, which in turn causes the planet gear carrier 88 to rotate as a rate of speed that is less than the rotation speed of the output shaft 136 of the power device 16. With the clutch plate 78 in the engaged orientation (FIG. 12), the power transmitting device 138 operates in a second operating state where the power device 16 and the pulley 66 rotate at different speeds.

Consequently, in the first operating state (FIG. 11), the output shaft 136 of the power device 16 and the pulley 66 rotate at the same speed. In the second operating state (FIG. 12) the output shaft 136 of the power device 16 and the pulley 66 rotate at different speeds, with the pulley 66 rotating at a speed that is less than the output shaft 136. In other word, in the second operating state, the planetary gear device 70 reduces the output speed provided to the pulley 66.

The power transmitting device 138 is switchable between the first operating state in which the input part 60 and the output part 62 rotate at a first speed ratio relative to one another and the second operating state in which the input part 60 and the output part 62 rotate at a second speed ratio relative to one another. In the depicted embodiment, the first speed ratio is one to on (1:1) and the second speed ratio is such that the output part 62 rotates at a speed that is lower than the speed of the input part 60.

The power transmitting device 138 (specifically, the speed ratio switching part 64) is configured such that the first speed ratio between the input part 60 and the output part 62 is such that the input part 60 and the output part 62 rotate at the same speed, and the second speed ratio between the input part 60 and the output part 62 is such that the output part 62 rotates at a speed that is between $\frac{1}{3}^{rd}$ and $\frac{2}{3}^{rd}$ of the speed of the input part 60. In the depicted embodiment, if the electromagnetically actuated clutch 68 should fail to operate, the power transmitting device 138 operates in a default mode (i.e. the first speed ratio). However, it should be understood that, alternatively, the power transmitting device 138 can be re-configured such that the first speed ratio and the second speed ratio can be reversed with the first speed ratio being such that the output part 62 rotates at a speed that is between $\frac{1}{3}^{rd}$ and $\frac{2}{3}^{rd}$ of the speed of the input part 60, and in the second speed ratio the input part 60 and the output part 62 rotate at the same speed, with the first speed ratio being the default mode.

The controller 42 operates the power transmitting device 138 (and in particular the electromagnetically actuated clutch 68 of the speed ratio switching part 64) in the same way the controller 42 operates the first and second power transmitting devices 28 and 40 of the first embodiment. Specifically, all of the operations described above with respect to FIGS. 5 and 6 are used by the controller 42 to operate the power transmitting device 138 of the third embodiment. Since the logic presented above in FIGS. 5 and 6 of the first embodiment applies fully to operation of the power transmitting device 138 of the third embodiment, further description is omitted to avoid duplication of description and for the sake for brevity.

Additionally, the controller 42 is also connected to the air conditioning system 20 and/or the compressor 30 such that the controller 42 is configured to switch the speed ratio switching part 64 between the first operating state and the second operating state in response determining whether the air conditioning system 20 and/or the compressor 30 is in operation or not in operation.

Employing the power transmitting device 138 on the power device 116 provides the benefit of reducing the torque burden on the power device 116 caused by operation of the accessory devices, such as the compressor 30 and the alternator 18. During heavy acceleration conditions, such as those represented in FIG. 5, the controller 42 can reduce the torque burden on the power device 116 to allow the power device 116 to devote more power to acceleration when the controller 42 determines that acceleration is more important than operation of accessories.

Fourth Embodiment

Figure 17:
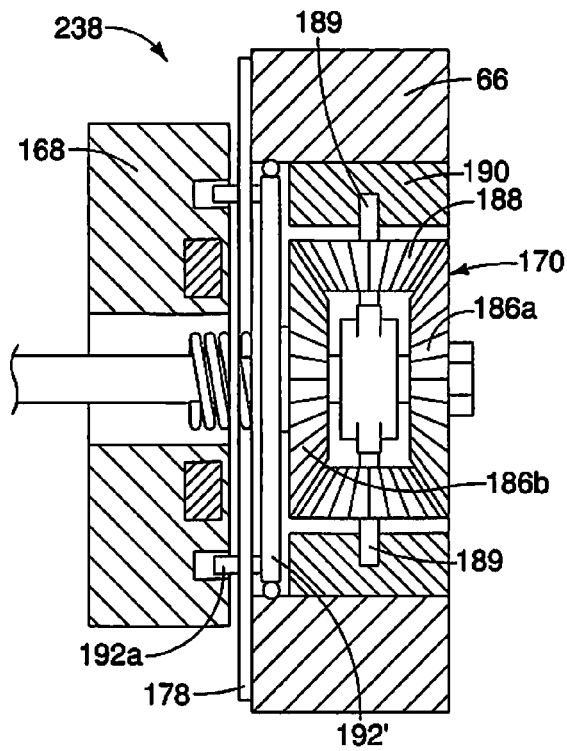
FIG. 17 is a schematic cross-sectional view of a power transmitting device showing details of an electromagnetically actuated clutch, a differential gear device and a pulley, with a clutch plate of the electromagnetically actuated clutch in a first operating state (a disengaged orientation) in accordance with a fourth embodiment.
Figure 18:
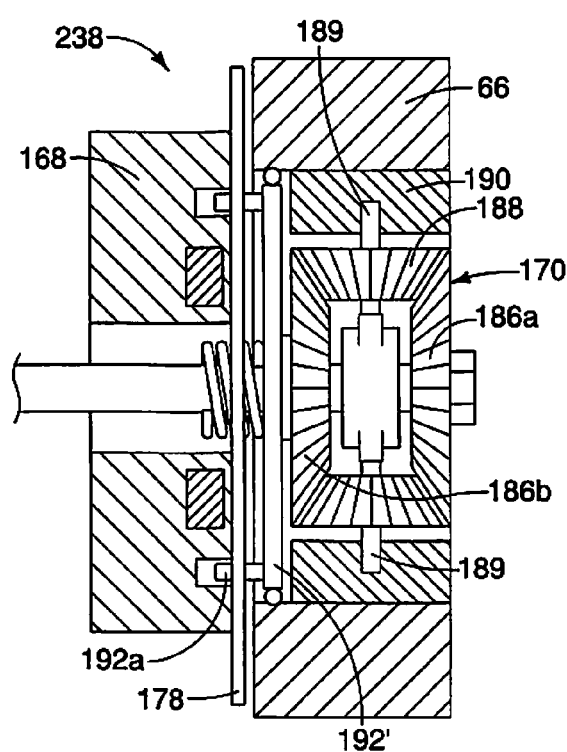
FIG. 18 is another schematic cross-sectional view of the power transmitting device similar to FIG. 17, showing the clutch plate of the electromagnetically actuated clutch in a second operating state (an engaged orientation) in accordance with the fourth embodiment.
Figure 19:
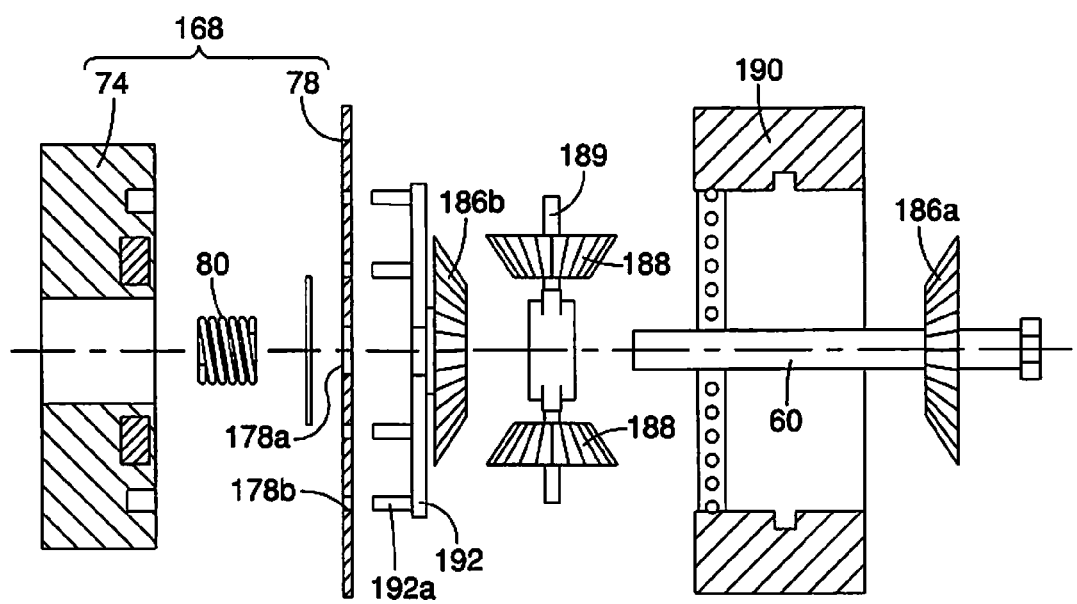
FIG. 19 is a schematic exploded cross-sectional view of the power transmitting device showing details of the electromagnetically actuated clutch and the differential gear device in accordance with the fourth embodiment.

Referring now to FIGS. 17-19, a power transmitting device 238 in accordance with a fourth embodiment will now be explained. In view of the similarity between the first, third and fourth embodiments, the parts of the fourth embodiment that are identical to the parts of the first and third embodiments will be given the same reference numerals as the parts of the first and/or third embodiments. Moreover, the descriptions of the parts of the fourth embodiment that are identical to the parts of the first and third embodiments may be omitted for the sake of brevity.

In the fourth embodiment, the power transmitting device 238 is installed within the vehicle 10 to the power device 116 in a manner that is the same as the installation of the power transmitting device 138 of the third embodiment. Since the structure of the vehicle 10, the power device 116 and the accessory devices is unchanged in the fourth embodiment as compared to the third embodiment, description of the vehicle 10, the power device 116 and the accessory devices is omitted for the sake of brevity.

In the fourth embodiment, the power transmitting device 238 includes an electromagnetically actuated clutch 168 and a differential gear device 170. The electromagnetically actuated clutch 168 includes the base member 74 as described above in the third embodiment, and a clutch plate 178. The base member 74, as in the third embodiment, is non-movably fixed to the power device 116 (for example, directly attached to the engine block of the power device 116). The operation of the electromagnetically actuated clutch 168 is identical to the electromagnetically actuated clutch 68 of the third embodiment. Therefore, further description of the electromagnetically actuated clutch 168 is omitted for the sake of brevity.

The differential gear device 170 includes a first gears 186a and 186b, second gears 188, a carrier shaft 189 and a carrier 190. The first gear 186a is a driven gear that is rigidly fixed to the output part 60. As with the third embodiment, the output part 60 is fixed to the output shaft 136 of the power device 116 such that the output shaft 136 of the power device 116, the output part 60 and the first gear 186a all rotate together as a single body. The second gears 188 rotate about the carrier shaft 189. The carrier shaft 189 is supported by the carrier 190. The carrier 190 is fixed to the pulley 66 such that the carrier 190, the carrier shaft 189 and the pulley 66 all rotate together as a single body.

The first gear 186b is fixed to a carrier plate 192 that includes pins 192a and a central apertures 192b. When the differential gear device 170 is fully assembled, the input part 60 extends through the central aperture 192b of the carrier plate 192 and extends through a central apertures 178a of the clutch plate 178. However, the carrier plate 192 and the clutch plate 178 are rotatable relative to the input part 60 absent operation of the electromagnetically actuated clutch 168.

The pins 192a of the carrier plate 192 extend through apertures 178b of the clutch plate 178. Consequently, the clutch plate 178, the carrier plate 192 and the first gear 186b all rotate together as a single body.

As shown in FIG. 17 with the electromagnetically actuated clutch 168 in the dis-engaged orientation, the clutch plate 178 engages the pulley 66 and the carrier 190 such that the carrier 190, the carrier plate 192 the pulley 66 and the clutch plate 178 all rotate together as a single body thereby operating in the first operating state.

As shown in FIG. 18 with the electromagnetically actuated clutch 168 in the engaged orientation, the clutch plate 178 engages the base member 74 such that the clutch plate 178 and the carrier plate 192 and the first gear 186b are prevented from rotating, there by operating in the second operating state. In the second operating state, the first gear 186a is rotated by the input part 60, causing rotation of the second gears 188. Since the first gear 186b is prevented from rotating, the rotation of the second gears 188 causes the carrier 190 and the pulley 66 to rotate at a rate of speed that is less than the rotational speed of the input part 60.

The controller 42 operates the power transmitting device 238 in the same way the controller 42 operates the first and second power transmitting devices 28 and 40 of the first embodiment (and the power transmitting device 138 of the third embodiment). Specifically, all of the operations described above with respect to FIGS. 5 and 6 are used by the controller 42 to operate the power transmitting device 238 of the fourth embodiment. Since the logic presented above in FIGS. 5 and 6 of the first embodiment applies fully to operation of the power transmitting device 238 of the fourth embodiment, further description is omitted to avoid duplication of description and for the sake for brevity.

The structure of the power transmitting devices 138 and 238 of the third and fourth embodiments is described in greater detail in U.S. patent application Ser. No. 14/973,292, filed Dec. 17, 2015. U.S. patent application Ser. No. 14/973, 292 discloses control logic that differs from the above described control logic. U.S. patent application Ser. No. 14/973,292 is commonly assigned to Nissan North America, Inc. and as a common sole inventor. U.S. patent application Ser. No. 14/973,292 is incorporated herein by reference in its entirety.

Fifth Embodiment

Figure 20:
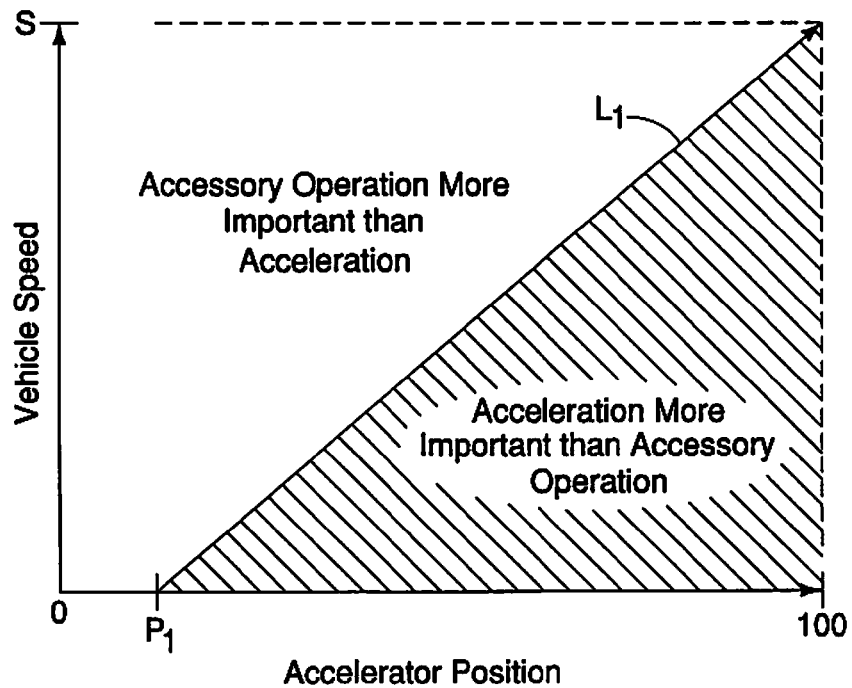
FIG. 20 is a graph showing accelerator positions and vehicle speeds and a first group of data points where acceleration is of greater importance the accessory operation, and a second group of data points where accessory operation is of greater importance than acceleration, in accordance with a fifth embodiment.
Figure 21:
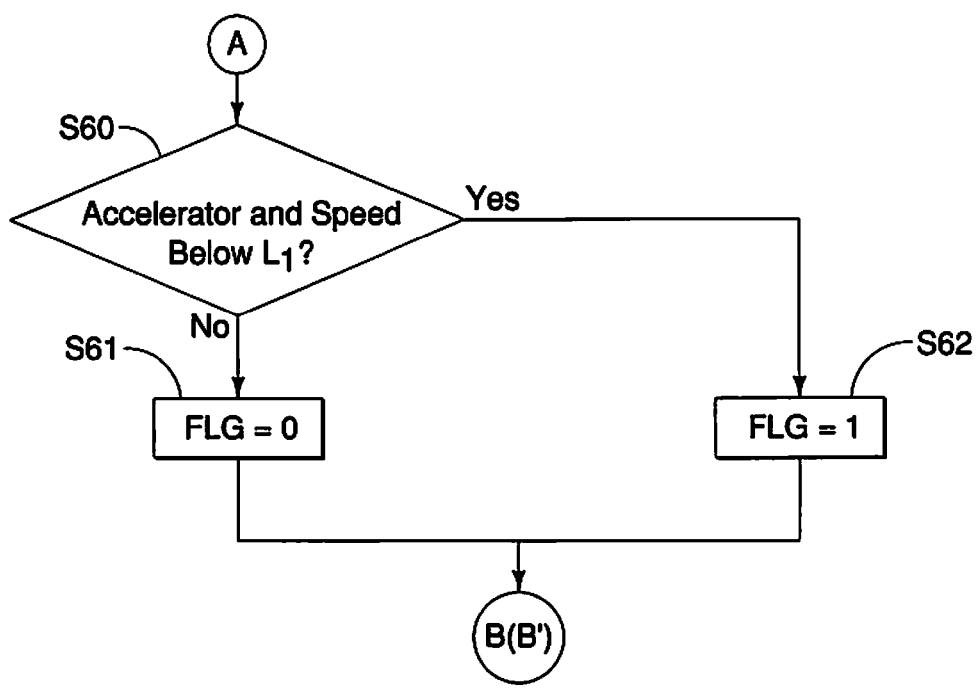
FIG. 21 is a flowchart showing operational steps in accordance with the fifth embodiment.

Referring now to FIGS. 20-21, control logic for the controller 42 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the first embodiment, FIG. 5 shows an example of logic used to determine which is of greater importance: vehicle acceleration; or accessory operation. The data and logic depicted in FIGS. 20 and 21 is another example of logic for determining whether vehicle acceleration is of greater importance, or whether vehicle accessory operation is of greater importance at the current vehicle speed and level of requested acceleration. The logic presented in FIGS. 20 and 21 represents an example of an alternative to the logic represented in FIG. 5. In other words, the logic presented in FIGS. 20 and 21 can replace FIG. 5 in the first embodiment, and used with the logic in FIG. 6. Specifically, the logic represented in FIGS. 20 and 21 is used with FIG. 6 by the controller 42 in this fifth embodiment.

A further embodiment can be utilized based on the second embodiment. Specifically, the logic in FIGS. 20 and 21 can be used by the controller 42 with the logic presented in FIGS. 7 and 8.

A description is now provided for the logic represented in FIGS. 20 and 21. FIG. 20 is a graph showing accelerator position measurements (X-axis) and vehicle speed measurements S (Y-axis). The point $P_1$ represents a minimum level of acceleration requested (determined by measuring movement of the accelerator pedal or movement of the throttle body linkage of the power plant). In order for acceleration to be considered of greater importance than accessory operation, the accelerator sensor 50 must detect a requested level of acceleration greater than that at the point $P_1$. The value of the point $P_1$ differs in model to model (vehicle to vehicle). For example, in a vehicle with a large capacity power device 16 where accessory loads represent a relatively small load of the overall power output of the power device 16, the value of the point $P_1$ will be much greater than the values of the point $P_1$ in vehicle with a small capacity power device 16 where accessory loads represent a much larger percentage of the overall output of the power device 16.

The slope of the line $L_1$ also differs from model to model (vehicle to vehicle) depending upon the size of the vehicle 10, the overall power output of the power device 16 and the amount of power necessary to operate the accessories. Therefore, no specific values are applied, except that along the X-axis, the point 100 represents 100% acceleration being requested. In other words, 100% represents the accelerator pedal (not shown) being measured at a maximum, for example, where the accelerator pedal is pressed completely to the floor of the vehicle 10.

Hence, when the controller 42 determines that a pair of coordinates corresponding to current accelerator position and current vehicle speed lie at a point below the line $L_1$ in FIG. 20, acceleration is of greater importance than accessory operation. Further, when the controller 42 determines that a pair of coordinates corresponding to current accelerator position and current vehicle speed lie at a point above or on the line $L_1$ in FIG. 20, accessory operation is of greater importance than acceleration.

In FIG. 21 at step S60, the controller 42 determines the location of a pair of coordinates corresponding to current accelerator position and current vehicle speed, as measured by the accelerator sensor 50 and the speed sensor 48, respectively. If the pair of coordinates lies above the line $L_1$, then operation moves to step S61. If the pair of coordinates lies below the line $L_1$, then operation moves to step S62. At step S61, the variable FLG is made equal to zero. At step S62 FLG is made equal to 1. After each of steps S61 and S62, operation moves to the logic in FIG. 6 (first embodiment) or to FIG. 7 (second embodiment).

The controller 42 preferably includes a microcomputer with a power transmitting device control program that controls the power transmitting devices 28, 40, 138 and 238, as discussed below. The controller 42 can also include other conventional components such as an input interface circuit, an output interface circuit, and storage devices such as a ROM (Read Only Memory) device and a RAM (Random Access Memory) device. The microcomputer of the controller 42 is programmed to control the power transmitting device 238. The controller 42 is operatively coupled to the various parts of the vehicle 10 as describe above in a conventional manner. The internal RAM of the controller 42 stores statuses of operational flags and various control data. It will be apparent to those skilled in the art from this disclosure that the precise structure and algorithms for the controller 42 can be any combination of hardware and software that will carry out the functions of the present invention.

The various vehicle elements and accessory devices are conventional components that are well known in the art. Since such elements and devices are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle accessory power management assembly. Accordingly, these terms, as utilized to describe the present invention should be interpreted relative to a vehicle equipped with the vehicle accessory power management assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle accessory power management assembly, comprising:
   a vehicle speed sensor configured to detect a current speed of a vehicle;
   a power device configured to produce rotary power that powers the vehicle;
   an accelerator sensor configured to detect a current of level of acceleration requested of the power device;
   an accessory device supported to the power device;
   a power transmitting device being coupled to the power device receiving rotational power therefrom and to the accessory device, the power transmitting device being switchable between a first operating state and a second operating state such that in the first operating state the accessory device is provided with rotary power from the power device via the power transmitting device at a first power consumption level and in the second operating state the accessory device is provided with rotary power from the power device via the power transmitting device at a second power consumption level that is lower than the first power consumption level; and
   a controller connected to the vehicle speed sensor, the accelerator sensor and the power transmitting device, the controller being configured to switch the switching part from the first operating state to the second operating state in response to the controller determining that at the current speed of the vehicle the current level of acceleration requested of the power device is of greater importance than operating the accessory device at the first operating state.

2. The vehicle accessory power management assembly according to claim 1, wherein
   the controller is configured to determine that the desired level of acceleration requested of the power device is of greater importance than operating the accessory device at the first operating state in response to one of the following conditions:
   the accelerator sensor detecting that the desired level of acceleration is greater than a first percentage of a full throttle condition and the vehicle speed is less than a first predetermined speed, and
   the accelerator sensor detecting that the desired level of acceleration is greater than a second percentage of a full throttle condition and the vehicle speed is less than a second predetermined speed, with the second percentage being greater than the first percentage by at least 10 percent and the second predetermined speed being at least 20 MPH greater than the first predetermined speed.

3. The vehicle accessory power management assembly according to claim 1, wherein
   the controller is configured to determine that the desired level of acceleration requested of the power device is of greater importance than operating the accessory device at the first operating state in response to one of the following conditions:
   the accelerator sensor detecting that the desired level of acceleration is greater than a first percentage of a full throttle condition and the vehicle speed is less than a first predetermined speed,
   the accelerator sensor detecting that the desired level of acceleration is greater than a second percentage of a full throttle condition and the vehicle speed is less than a second predetermined speed, with the second percentage being greater than the first percentage by at least 10 percent and the second predetermined speed being at least 20 MPH greater than the first predetermined speed, and the accelerator sensor detecting that the desired level of acceleration is greater than a third percentage of a full throttle condition and the vehicle speed is less than a third predetermined speed, with the third percentage being greater than the second percentage by at least 10 percent and the third predetermined speed being at least 20 MPH greater than the second predetermined speed.

4. The vehicle accessory power management assembly according to claim 1, wherein the controller is configured to return the switching part to the first operating state after operating in the second operating state for a first predetermined period of time.

5. The vehicle accessory power management assembly according to claim 4, wherein the first predetermined period of time is 10 seconds.

6. The vehicle accessory power management assembly according to claim 5, wherein the controller is configured to return the switching part to the second operating state for a second predetermined period of time after operating in the first operating state for the first predetermined period of time in response to the controller determining that the current level of acceleration requested of the power device continues to be of greater importance than operating the accessory device at the first operating state.

7. The vehicle accessory power management assembly according to claim 6, wherein the second predetermined period of time is 15 seconds.

8. The vehicle accessory power management assembly according to claim 1, wherein the accessory device is an air conditioning compressor, and the power transmitting device is an air conditioning compressor clutch, with the first operating state being a clutch engaged state where power from the power device is transmitted to the air conditioning compressor and the second operating state is a clutch dis-engaged state where no power from the power device is transmitted to the air conditioning compressor.

9. The vehicle accessory power management assembly according to claim 1, wherein the accessory device is a variable stroke air conditioning compressor, and the power transmitting device is a displaceable member of the variable stroke air conditioning compressor, with the first operating state corresponds to a first angular orientation of the displaceable member causing maximum compression of refrigerant by the variable stroke air conditioning compressor and the second operating state corresponds to a second angular orientation of the displaceable member causing a reduced level of compression of refrigerant by the variable stroke air conditioning compressor.

10. The vehicle accessory power management assembly according to claim 9, further comprising:

a temperature sensor configured to detect temperatures of an air conditioning evaporator, and wherein the controller is further connected to the temperature sensor and is configured to further to return the switching part to the first operating state after operating in the second operating state in response to determining that the temperature at the air conditioning evaporator is at or above a first predetermined temperature.

11. The vehicle accessory power management assembly according to claim 10, wherein the controller is configured to return the switching part to the second operating state after operating in the first operating state in response to the controller determining that the temperature at the air conditioning evaporator is at or below a second predetermined temperature lower than the first predetermined temperature with the current level of acceleration requested of the power device continuing to be of greater importance than operating the accessory device at the first operating state.

12. The vehicle accessory power management assembly according to claim 1, wherein the accessory device is an alternator.

13. The vehicle accessory power management assembly according to claim 1, wherein the power transmitting device is a planetary gear mechanism operably located between the power device and the accessory device, the power transmitting device further including an electromagnetically actuated clutch such that with the electromagnetically actuated clutch in a de-activated state the power transmitting device operates in the first operating state and in the activated state the power transmitting device operates in the second operating state.

14. The vehicle accessory power management assembly according to claim 4, wherein the power transmitting device includes an electromagnetically actuated clutch such that with the electromagnetically actuated clutch in a de-activated state the power transmitting device operates in the first operating state and in the activated state the power transmitting device operates in the second operating state.

15. The vehicle accessory power management assembly according to claim 1, wherein the power transmitting device is a differential gear system.

16. The vehicle accessory power management assembly according to claim 1, wherein the power transmitting device is located at the accessory device.

17. The vehicle accessory power management assembly according to claim 1, wherein the power transmitting device is located at the power device.

\* \* \* \* \*